US012705664B1

(12) United States Patent
Modi et al.

(10) Patent No.: US 12,705,664 B1
(45) Date of Patent: Aug. 11, 2026

(54) AUTOMATED CHECKOUT SYSTEM WITH VIDEO AND RFID

(71) Applicant: Amazon Technologies, Inc., Seattle, WA (US)

(72) Inventors: Akash Modi, Bengaluru (IN); Kushagra Srivastava, Bellevue, WA (US); Sandipan Saha, Bangalore (IN); Chirag Dilip Chauhan, Mumbai (IN); Srihari Manoharan, Bellevue, WA (US); Amit Dekate, Medina, WA (US); Robert Jerome Colwill, Bainbridge Island, WA (US); Tarun Kumar Garg, Jurhera (IN)

(73) Assignee: Amazon Technologies, Inc., Seattle, WA (US)

( * ) Notice: Subject to any disclaimer, the term of this patent is extended or adjusted under 35 U.S.C. 154(b) by 292 days.

(21) Appl. No.: 18/513,408

(22) Filed: Nov. 17, 2023

(51) Int. Cl.
*G06Q 30/00* (2023.01)
*G06Q 20/20* (2012.01)
*G06Q 20/32* (2012.01)
*G06Q 30/0601* (2023.01)

(52) U.S. Cl.
CPC ....... *G06Q 30/0633* (2013.01); *G06Q 20/208* (2013.01); *G06Q 20/3278* (2013.01); *G06Q 30/0643* (2013.01)

(58) Field of Classification Search
CPC ........... G06Q 30/0601; G06Q 30/0631; G06Q 30/0641; G06Q 30/0643
See application file for complete search history.

(56) References Cited

U.S. PATENT DOCUMENTS

| | | | | |
|---|---|---|---|---|
| 9,117,106 | B2 | 8/2015 | Dedeoglu et al. | |
| 9,235,928 | B2 | 1/2016 | Medioni et al. | |
| 9,473,747 | B2 | 10/2016 | Kobres et al. | |
| 2003/0107649 | A1* | 6/2003 | Flickner | G06V 10/758 348/169 |
| 2003/0158796 | A1* | 8/2003 | Balent | G06Q 30/06 705/28 |
| 2008/0120193 | A1* | 5/2008 | Schuller | G06Q 30/02 705/414 |

(Continued)

OTHER PUBLICATIONS

Busu, M. F. M., et al. "Auto-checkout system for retails using Radio Frequency Identification (RFID) technology." 2011 IEEE Control and System Graduate Research Colloquium. IEEE, 2011. (Year: 2011).*

(Continued)

*Primary Examiner* — Christopher B Seibert
(74) *Attorney, Agent, or Firm* — Athorus, PLLC

(57) ABSTRACT

This disclosure describes systems for enabling a just-walk-out (JWO) facility in which users may enter the facility, physically pick one or more items, and walk out of the facility to rent, purchase, or otherwise acquire the items without needing to perform a manual checkout for the items. In some instances, a tag, such as an RFID tag, may attach to each item in the facility, which may include an exit system that includes RFID readers for detecting when a tag exits the facility. The exit system may also include one or more cameras that may be used to help identify which of multiple checkout lanes the tag and item exited through for ensuring that the item is associated with the proper user account and/or the appropriate payment instrument is charged.

20 Claims, 9 Drawing Sheets

(56) References Cited

U.S. PATENT DOCUMENTS

2008/0159181 A1* 7/2008 Anderson ............... H04L 12/66 370/271
2008/0226119 A1* 9/2008 Candelore ............. G06F 16/587 382/100
2008/0279481 A1* 11/2008 Ando ...................... G06F 16/48 705/26.1
2009/0063307 A1* 3/2009 Groenovelt .......... G06Q 10/087 705/28
2009/0128335 A1* 5/2009 Leung ................ G06Q 30/0207 705/14.1
2010/0046842 A1* 2/2010 Conwell ................. G06F 18/24 382/218
2011/0153614 A1* 6/2011 Solomon ................ B65G 1/127 707/769
2011/0246064 A1* 10/2011 Nicholson ............. G06T 19/006 701/467
2011/0320296 A1* 12/2011 Edwards .............. G06Q 20/208 235/382
2012/0206605 A1* 8/2012 Buehler ........... G08B 13/19693 348/159
2012/0209741 A1* 8/2012 Bonner .................. G06Q 30/08 705/26.3
2012/0224076 A1* 9/2012 Niedermeyer ......... G06Q 30/02 348/E5.043
2013/0117053 A2* 5/2013 Campbell ............ G06Q 10/087 705/7.11
2013/0179303 A1* 7/2013 Petrou ................ G06Q 30/0623 705/26.61
2013/0284806 A1 10/2013 Margalit
2014/0052555 A1* 2/2014 MacIntosh ............... G07G 1/12 705/23
2014/0152847 A1* 6/2014 Zomet ................ G06Q 30/0629 348/222.1
2014/0171116 A1* 6/2014 LaMarca ........... H04M 1/72403 455/456.3
2014/0197991 A1* 7/2014 Mkrtchyan ........... G01S 13/878 342/464
2014/0201042 A1* 7/2014 Meyer .................. G06Q 10/087 705/28
2014/0342754 A1* 11/2014 Liu ....................... G01S 5/0252 455/456.2
2015/0029339 A1* 1/2015 Kobres .................. H04N 7/181 348/150
2016/0321481 A1* 11/2016 Bottazzi ................. G06K 17/00
2017/0032290 A1* 2/2017 Ford .................... G06Q 10/087
2017/0331807 A1* 11/2017 Mont-Reynaud ... H04W 12/082
2018/0109338 A1* 4/2018 Walden .............. G06Q 30/0267
2018/0232796 A1* 8/2018 Glaser .................... G06Q 90/20
2018/0285812 A1* 10/2018 Humphrys ......... G06Q 30/0639
2018/0307877 A1* 10/2018 Sundaresan .......... G07G 1/0081
2019/0333039 A1* 10/2019 Glaser .................. G06Q 20/202
2020/0226331 A1* 7/2020 Khojastepour .... G06K 7/10128
2021/0264756 A1* 8/2021 Sagar ...................... H04W 4/80
2023/0153878 A1* 5/2023 Glaser ................ G06Q 30/0637 705/26.25
2023/0386070 A1* 11/2023 Spruell ................. H04W 4/029
2024/0095718 A1* 3/2024 McDaniel ............ G06Q 20/208

OTHER PUBLICATIONS

Kulkarni, Sandeep S., and Nitin H. Vaidya. "Effectiveness of delaying timestamp computation." Proceedings of the ACM Symposium on Principles of Distributed Computing. 2017. (Year: 2017).*

* cited by examiner

AUTOMATED CHECKOUT SYSTEM WITH VIDEO AND RFID

BACKGROUND

Traditional physical stores maintain an inventory of items in customer-accessible areas such that customers can pick items from the inventory and take them to traditional checkout stand for purchase, rental, and so forth. In other instances, meanwhile, retail environments may include sensors to generate information about events occurring in these facilities such that customers can pick items and automatically pay for the items upon exiting the store and without engaging in a manual payment process.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 5 illustrates an example sequence of operations including a user providing payment data to a payment reader associated with a checkout lane, readers associated with different checkout lanes generating reader data indicating that a tag associated with an item potentially transitioned through each checkout lane, receiving image data of a user passing through one of the checkout lanes, and charging the payment instrument for the item based on determining which checkout lane the tag transitioned through.

DETAILED DESCRIPTION

Figure 1:
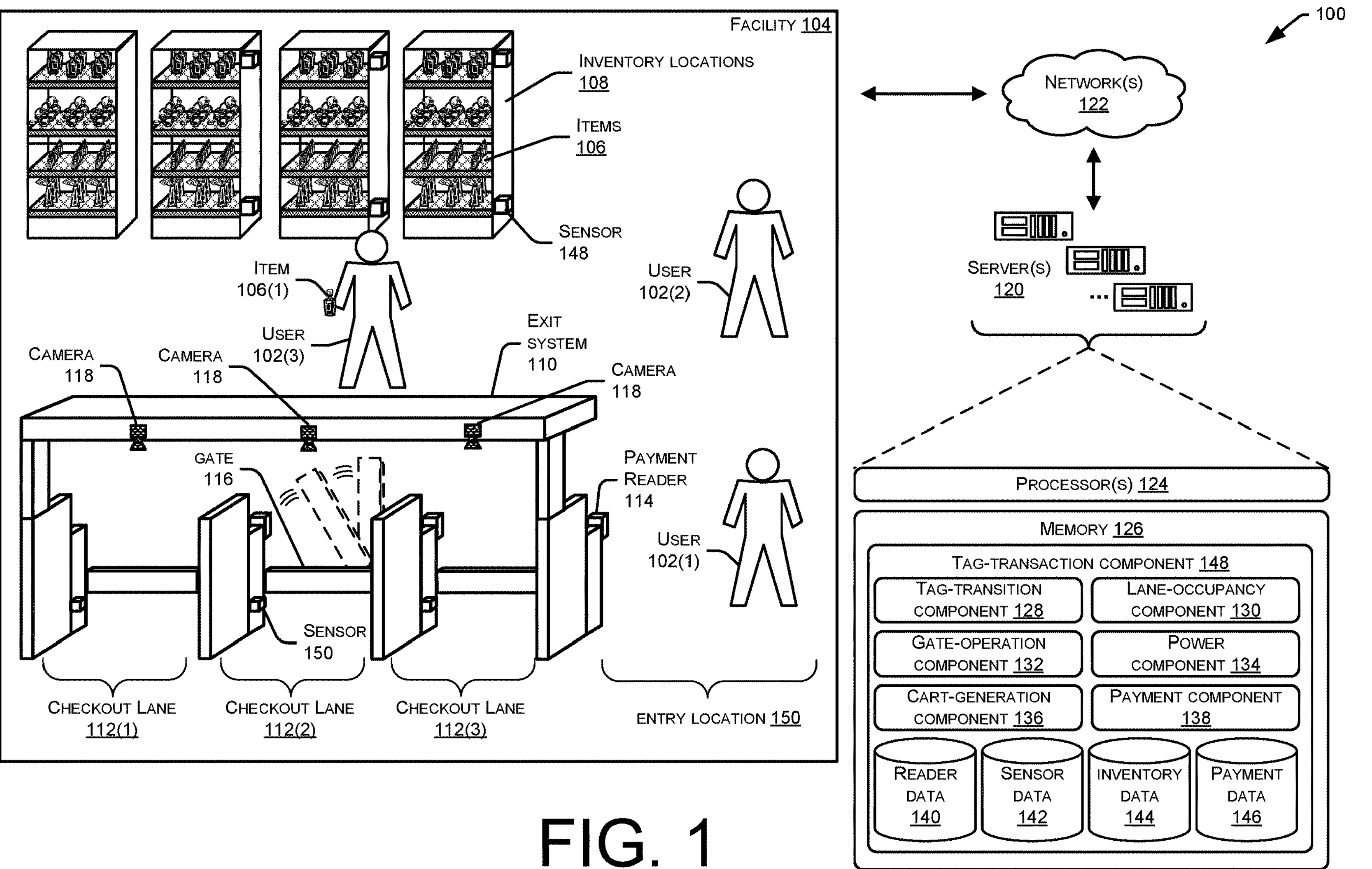
FIG. 1 illustrates an example facility that is associated with a system in which users enter the facility, acquire items having tags attached thereto, and walk through one of multiple checkout lanes after which the system charges the exiting user for the items based on an analysis of which tags were determined to have exited the facility.

This disclosure describes, in part, systems for enabling a just-walk-out (JWO) facility in which users may enter the facility, physically pick one or more items, and walk out of the facility to rent, purchase, or otherwise acquire the items without needing to perform a manual checkout for the items. In some instances, a tag, such as a radio frequency identification tag (an RFID tag), may attach to each item in the facility. The RFID tag may uniquely identify the particular item to which it is attached. In some instances, the facility may include an exit system that includes one or more RFID readers for detecting when a tag exits the facility such that an item associated with the tag may be associated with a user account and/or charged to a payment instrument associated with a user that took the item that includes the tag out of the facility. The exit system may also include one or more additional sensors to help identify which of multiple checkout lanes the tag and item exited through for ensuring that the item is associated with the proper user account and/or the appropriate payment instrument is charged.

In some instances, the exit system may include multiple lanes through which a user carrying one or more items to which respective tags are affixed. Further, each lane may be associated with one or more first reader antennas (e.g., RFID reader antennas) configured to read each tag as the user approaches the checkout lane and one or more second reader antennas configured to read each tag as the user passes through and exits the checkout lane. It is to be appreciated that the one or more first reader antennas and the one or more second reader antennas (as well as the different sets of reader antennas described herein) may reside in the same electronic housing(s) or in different housings. For instance, a single electronic-device housing may include the one or more first reader antennas configured to read each tag as the tag approaches the checkout lane, as well as the one or more second reader antennas configured to reach each tag as the tag exits the checkout lane. That is, the first reader antennas may be associated with a first read zone that is on a first side (e.g., inside the facility) of the first checkout lane, while the second reader antennas may be associated with a second read zone that is a second size (e.g., outside the facility) of the checkout lane. In other instances, meanwhile, the one or more first reader antennas may reside one or more respective first electronic-device housings, while the one or more second reader antennas may reside in one or more respective second electronic-device housings. For ease of description, the following examples describe first reader(s) configured to detect tags in a first zone of a checkout lane and second reader(s) configured to detect tags in a second zone of the checkout lane. It is to be appreciated, however, that the “first readers” and the “second readers” may corresponding to first and second reader antennas that may reside in the same or different housings.

The exit system may further include or otherwise couple to one or more computing devices configured to analyze this data generated by the readers to determine when each of one or more tags has transitioned through the checkout lane. Upon determining that a particular tag has transitioned through the checkout lane, the system may then perform one or more predefined actions, such as determining the item associated with each tag and associating this item with a user account of a user that exited through the checkout lane, charge a payment instrument of the user for the item(s), and/or the like.

While these techniques may work well in a single-checkout-lane environment, some exit systems described herein may include multiple checkout lanes, each of which may be associated a set of first reader(s) configured to read each tag as the user approaches the respective checkout lane and one or more second readers configured to read each tag as the user passes through and exits the respective checkout lane. Therefore, in a multi-lane environment, a tag passing through a first checkout lane may result in the tag being read by first and/or second readers associated with the first checkout lane, first and/or second readers associated with a second checkout lane, and so forth. Thus, the system may have difficultly determining exactly which checkout lane the tag and item passed through and, thus, which user account to associate with the item, which payment instrument to charge, and/or the like.

In order to increase accuracy of these determinations, the systems described herein may utilize sensor data generated by additional sensors of the exit system. For example, the exit system may include a respective sensor (e.g., a camera) associated with each respective checkout lane configured to generate sensor data that may be used to determine when a user is in the lane and/or passing through the exit system. The image data may be used to identify when a user passes through the read zones and therefore a cart of items for that user may be generated based on the tags that pass through the read zone.

In some examples, each checkout lane may include a beam-breaker sensor configured to shoot a beam across the checkout lane and detect when the beam has been broken, thus indicating the presence of a user passing through the lane and/or to trigger a camera or image sensor to mark timestamps in the video and/or image data associated with a particular user passing through the exit system. The image and/or video data may be cropped and/or separated from a stream of image data and may be processed to determine one or more items associated with the user based on the image data.

The image processing may be performed in a manual and/or automated process. In some examples, the system may convey the cropped video data to a remote processing location where it may be manually reviewed by one or more individuals and/or systems to identify items present within the view of the camera from the image data. The manual process may involve an individual manually marking items carried through the exit system by a user. Additional data, such as RFID data may be conveyed with the image data and/or associated with the image data such that the individual may tag or mark items visible in the image data that are also present in the RFID data. In this manner, the RFID data may be used with the camera data to increase the accuracy and performance of the automated exit system. The RFID data and image data may be used to generate training data for one or more machine-learned models to identify items based on RFID and/or image data from the exit system.

In a manual process, an individual may tag the RFID data and/or image data based on the customer, the item, the location within the exit system, the time of exit, and other such information. In a semi-automated process, one or more algorithms and/or machine-learned models may suggest associations or tags for an individual to apply to the RFID data and/or image data. In an automated process, one or more algorithms and/or machine learned models may generate tags and/or virtual shopping carts associated with the user.

In some examples, the review, through a manual, automated, or semi-automated process may be used to generate ground truth data for training one or more machine-learned models for generating cart data for individuals passing through the exit system based on RFID and/or image data.

In some examples, the RFID data may be used to generate a heat map of the exit system with probabilities or confidence scores of the heat map indicative of a likelihood that the RFID tag passed through the exit system at a particular location. The RFID data and/or the image data may be used by a machine-learned model to generate the heat map to determine confidence levels for items passing through the exit system through multiple parallel lanes.

The system may receive this sensor data and corresponding timestamp data to determine which of the multiple checkout lanes was occupied by a user at or near a time when the tag was determined to transition out of the facility via one or more checkout lanes. For example, a gate associated with each lane may be used to determine a start and/or end time period for a user to pass through a particular lane, based on when the gate is open and closed. In some examples the gate may be at one or both sides of the exit system. In instances where the readers of a particular checkout lane determined that the tag transitioned through the respective checkout lane and the sensor (e.g., beam breaker) of that particular checkout lane detected the presence of a user at or near the same time, the system may determine that the tag and corresponding item in fact transitioned through that checkout lane. Thus, the item may be associated with the user account of the user that passed through the checkout lane, the payment instrument of the user may be charged, and/or the like.

To provide an example, envision that an exit system of a facility includes a first checkout lane and a second checkout lane, each of which is associated with a first set of readers configured to detect a tag approaching the checkout lane and a set of second readers configured to detect the tag exiting the checkout lane. Further, each checkout lane may include a respective image sensor configured to gather image data of the respective lane during an exit period for a user. In this example, when a tag that is coupled to an item carried by a user passes through one of the checkout lanes, both the readers associated with the first checkout lane and the readers associated with the second checkout lane may detect the tag, thus making it difficult to determine whether the tag exited the facility through the first checkout lane or the second checkout lane. The techniques described herein, however, may also analyze the image data generated by the image sensors to determine which lane was occupied and/or which lane the item is visible in and, thus, to determine which lane the tag exited through.

For instance, envision that each set of readers generate reader data indicative of a tag exiting through the respective checkout lane at or near a first time. The techniques may then determine whether the image sensor from either or both of the checkout lanes has generated data indicative of a user occupying the respective lane within a threshold amount of time of the first time and/or analysis of the image data may reveal a visual identification of the item passing through the exit system to increase a confidence associated with the item passing through a particular one of the multiple lanes. For instance, if the user in fact walked through the first checkout lane, then the image sensor associated with the first checkout lane may have generated sensor data indicative of the user occupying the first checkout lane at a second time that is near in time to the first time. The image sensor of second checkout lane, however, would not have generated such data if no user passed through the second checkout lane near the first time. Thus, the techniques described herein may use the generated RFID data coupled with the sensor data from the image sensors to determine which lane the tag transitioned through.

Further, in some instances the techniques described herein may use the sensor data in addition to the RFID data in each instance, when an event determined with use of the reader data has a low confidence value (but not when events are high confidence), or the like. For instance, the techniques may analyze generated reader data to determine whether a threshold difference exists between the reader data generated by the respective sets of readers associated with different checkout lanes and, if so, may determine that the tag transitioned through that respective lane with high confidence. Thus, the techniques might not analyze the sensor data indicating lane occupancy. In some instances, the confidence is determined based on signal strength, read counts, and/or the like. For instance, if first and second readers generate read data having a threshold signal strength and/or read count, then the techniques may determine that the tag exited through that lane without reference to the beam-break-sensor data. If, however, no reader data meets this threshold, or an amount of separation between the respective reader data is not sufficient, then the techniques may analyze the image sensor data for making the determination.

Further, while the above examples describe using a sensor within the exit system to help increase accuracy, in other instances the systems described herein may use sensor data generated by other sensors to increase this accuracy. For instance, the facility may include other sensors such as overhead cameras, weight sensors, additional RFID readers, and/or the like, some or all of which may be used to determine which tags, and thus items, have been removed from the facility. In one example, inventory locations within the facility may include respective readers (e.g., RFID readers) that are configured to detect the presence and/or absence of items in the inventory location. For instance, if a particular inventory location houses a number of shirts, one or more readers may be used to generate reader data for determine a current number of shirts at the inventory location over time. If the number decrements by one or more, and if the system determines (e.g., with low confidence) that a tag associated with this shirt has exited the facility, the system may use the absence of this tag associated with the shirt to increase the confidence that this shirt did in fact exit the facility.

In some instances, the systems described herein may perform other techniques for ensuring that the system accurately determines which tags and corresponding items exit through which checkout lane. For instance, as noted above, each checkout lane may include a physical gate configured to transition from an open state to a closed state to allow one or more users to exit through the respective checkout lane. These physical gates may reside at the entry point of a respective checkout lane, at an end of the respective checkout lane, in the middle of the respective checkout lane (e.g., representing a demarcation between a first and second zone of a checkout lane), and/or the like. In some instances, the system may stagger the times at which the physical gates open such that a first checkout lane is available to pass through while other checkout lanes are not (e.g., because their gate remains closed), a second checkout lane is available to pass through while other checkout lanes are not (e.g., because their gate remains closed), and so forth. By staggering the opening and closing of these gates in this manner, users may pass through the checkout lanes at staggered times as well, thus lessening the opportunity for inaccuracies introduced by multiple tags passing through the gates at the same or similar times and being read by each of the lane readers. In the example above, for instance, staggering the opening and closing of these gates may reduce the chances that two users are occupying adjacent lanes at the same time, thus increasing the likelihood of accurately determining which lane a tag transitioned through.

In some instances, the techniques may quantize a first timestamp associated with the reader data with a second timestamp associated with sensor data generated by the image sensor (or other sensor) if these timestamps are within a threshold time of one another. For instance, envision that reader data generated by readers associated with a first checkout lane is analyzed to determine that a tag may have transitioned through the first checkout lane at a first time. Further, sensor data generated by a image sensor associated with the first checkout lane may indicate that a user occupied the first checkout lane at a second time, which may be before or after the first time. If these two times are within a threshold amount of time of one another, these times may be associated with a common time (e.g., the first time, the second time, an average time of the two, or the like) to ensure that the item associated with the tag is on the appropriate user receipt or account.

In addition to the above, the systems described herein may increase accuracy by powering on or powering up different readers of the exit system just prior to a user passing through a respective checkout lane, but not prior. Thus, the readers may remain off or powered down while users are not passing through, thus avoiding these readers reporting the detection of tags that are not in fact passing through these reader's respective checkout lanes. For instance, each checkout lane may be proximate to and associated with a sensor that is configured to detect a user approaching and, upon detecting a user, may cause the readers of that particular checkout lane to power on or power up. For instance, each checkout lane may include a motion sensor, beam breaker, time of flight sensor, and/or any other type of sensor configured to detect an approaching user.

In addition, the systems described herein may enable multiple users to pass through a single checkout lane in a single session and may charge the same payment instrument for each item carried by the multiple users. For instance, a first user may approach a first checkout lane and provide payment data associated with a payment instrument to a payment reader associated with the first checkout lane. In response, the physical gate associated with the first checkout lane may open and the first user may pass through the from the first portion of the first checkout lane through the second checkout lane while carrying one or more items associated with respective tags. The system may receive reader data identifying these tags and, in addition to sensor data generated by an image sensor, may determine to add these items to a virtual cart. In addition, if a second user carrying one or more items associated with respective tags passes through the first checkout lane prior to the gate closing, the system may also receive reader data identifying these tags and, in addition to sensor data generated by a image sensor or other sensor, may determine to add these items to the same virtual cart, given that the gate has yet to close or based on other visual cues from the image data, such as the people passing through together, side by side, in a group or cluster, or other such indications. Further, if any other users pass through the first checkout lane prior to the gate closing (and/or within a threshold amount of time of the gate opening), any items associated with tags determined to pass through the first checkout lane may also be added to the virtual cart. Upon or after the gate closing, the system may then charge the payment instrument for each item carried by each user. Further, in some instances the checkout lane may include a proximity sensor such that a gate remains open while users are exiting, thus enabling items carried by each user of the group to be placed on the same receipt.

In addition, while the above examples describe using the techniques at exit locations of a facility, these techniques may also be used at other locations in facilities. For instance, these techniques may be used in instances where a facility includes a multi-lane entry system. In this example, the techniques may be used to determine which lane of the entry system a particular tag transitioned through, whether that be into the facility or out of the facility. In one example, the techniques may be used to identify when a tag coupled to an item has exited the facility through the entry location, such that an alarm may be triggered, a camera may be turned on, and/or the like. In addition, the ability to determine which lane the user carrying the tag went through may enable a camera associated with that lane to acquire an image of the user, turn on an audible or visual alarm at that entry lane, and/or the like.

In addition, the techniques described herein may be used for maintaining inventory data representing a current quantity of items available at the facility. For instance, as items coupled to respective tags are brought into (or out of) the facility, the system may update the inventory data associated with the facility. For instance, if a user associated with the facility brings ten shirts into the facility, with each shirt including a tag associated with the item, the inventory data may be updated to indicate the addition of these ten shirts.

Therefore, the techniques described herein may be used in a JWO facility, which may include one or more entry locations for entering the facility and one or more exit locations for exiting the facility. For example, the facility may include an entry location at which an entering user may or may not provide information for identifying an account of the user. For example, the entry location may include a scanner or other imaging device at which an entering user scans or otherwise provides a unique code associated with the account of the user, such as a code displayed on a mobile device of the user. In some examples, the first entry location may include a microphone, camera, or other sensor that generates sensor information at the request of the user for use in identifying the account of the user. In still other instances, the first entry location may include an input device for reading information from a payment card of a user, such as a credit card, debit card, prepaid card, etc. For example, the first entry location may include a scanner or camera that scans or captures an image of a payment card, a card reader that receives information from a payment card via a swipe, dip, tap, or the like, or may include any other type of input device configured to receive payment or account information.

In other instances, the entry location might not be associated with a device for receiving information identifying a user account, but instead this information may be generated at an exit location of the facility. For instance, the exit location may include a scanner or other image device for receiving information for identifying a user account, a payment reader for receiving payment data, and/or any of the other devices described above with reference to the entry location. For instance, the exit location may include an input device for reading information from a payment card of a user (e.g., a credit card, debit card, prepaid card, etc.), for receiving cash for paying for items, or the like. For example, the first exit location may include a scanner or camera that scans or captures an image of a payment card, a card reader that receives information from a payment card via a swipe, dip, tap, or the like, or may include any other type of input device configured to receive payment or account information. In instances where a user provides information for identifying an account of the user (at the entry location or the exit location), the account of the user may be associated with a payment instrument of the user such that the payment instrument is able to be charged for items procured by the user, with the charge occurring automatically upon exit of the facility by the user and without the user needing to engage in a manual checkout process of the items.

While some of the examples below are described with reference to a materials handling facility (e.g., a brick-and-mortar retail store, a fulfillment center, etc.), the systems and techniques may be implemented for detecting events in any type of facility, an airport, a classroom, an outdoor environment, or any other location. Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example architecture 100 that includes users 102(1), 102(2), and 102(3) in an example facility 104 in which the users (collectively "users 102") may enter through an entry location 150 and acquire one or more items 106 from their respective inventory locations 108 before exiting the facility 104 via an exit system 110. As introduced above and described in detail below, the exit system 110 may include various readers, camera, and/or other sensors for identifying which items each user exits the facility 104 with for associating the item(s) with a user account, charging the respective user for the cost of the items, or the like. While this example describes the exit system 110 facilitating acquisition of the items for the respective users, the techniques described herein may additionally or alternatively be used for generating inventory data, identifying theft, and/or the like, as discussed above.

In this example, the facility includes items 106 having tags attached thereto (e.g., radio frequency identification "RFID" tags), and the exit system 110 enables each user 102 to walk through one of multiple checkout lanes after which the system 110 and/or one or more server computing devices 120 charges the exiting user for the items based on an analysis of which tags were determined to have exited the facility 104. In some instances, each checkout lane may be associated with different sets of readers for identifying the tags. In addition, image data generated by one or more cameras may be used to determine which checkout lane the user exited and, thus, which user and/or payment instrument to charge for the items.

In the illustrated example, the exit system 110 defines a first checkout lane 112(1), a second checkout lane 112(2), and a third checkout lane 112(3). It is to be appreciated that while this example defines three checkout lanes, the techniques described herein may apply to any number of checkout lanes. Each checkout lane may also be associated with a respective payment reader 114, such as illustrated payment reader 114 associated with the checkout lane 112(3). Each payment reader, such as the payment reader 114, may enable a user to provide payment data by inserting, swiping, dipping, tapping, scanning or otherwise providing payment data associated with a payment instrument. Further, while this example describes a payment reader 114, other examples may include a device to receive information for identifying a user or user account, which in turn may be used to identify payment data associated with a payment instruction. For instance, each checkout lane may be associated with a scanner or other imaging device for scanning a unique code associated with a user account of a user that is going to proceed through the checkout lane.

Figure 2A:
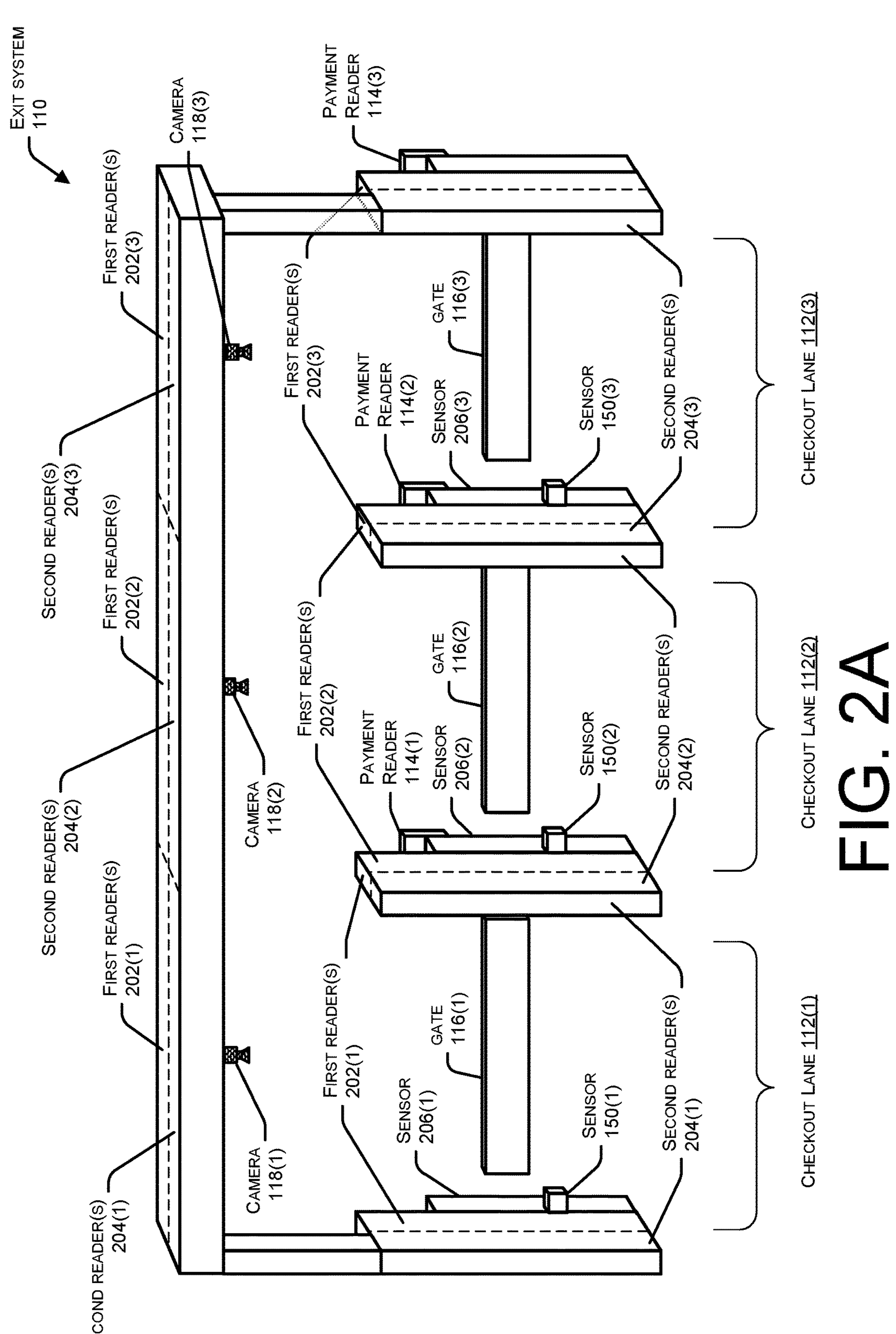
FIGS. 2A-B each illustrate additional details of an exit system introduced in FIG. 1, including a respective payment reader at each checkout lane for receiving payment data for paying for items that a user carries out of the facility, as well as a physical gate configured to open upon receiving the payment data and close after one or more users pass through the respective checkout lane.
Figure 2B:
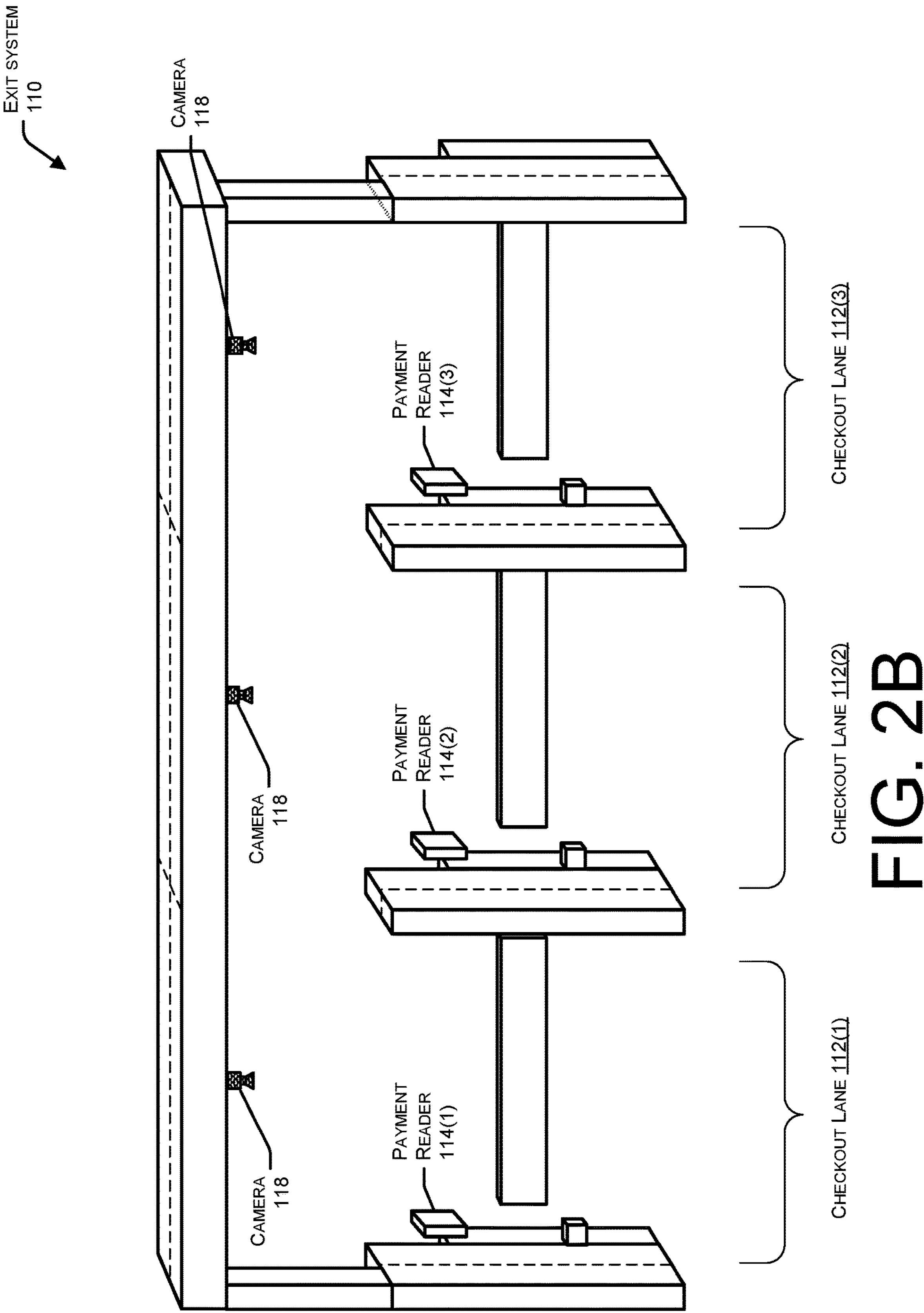

In addition, each checkout lane may include a physical gate, such as illustrated physical gate 116 associated with the checkout lane 112(2). The physical gate may, in some instances, transition from a closed state to an open state in response to the user providing payment data to the respective payment reader, in response to a proximity sensor identifying a user approaching the respective gate, or the like. In some instances, the exit system 110 or the servers 120 may stagger when the respective physical gates of the checkout lanes transition to the open state in order to increase the accuracy regarding identifying which checkout lane one or more tags transitioned through, as introduced above and discussed below. In addition, the exit system may include different sets of readers (e.g., RFID readers) for generating reader data indicative of respective tags approaching and exiting through respective checkout lanes. Each checkout lane 112 may also be associated with a sensor, such as illustrated sensor 118, for generating sensor data indicative of whether the checkout lane is occupied by a user and, if so, at what time. FIGS. 2A-B and its corresponding discussion illustrates and discuss these readers and sensors in further detail.

The exit system 110 may thus include readers for detecting tags that approach and exit through the respective checkout lanes, as well as sensors for detecting when each checkout lane is occupied by a user and when it is not. This reader data, combined with the image data, may be used by the exit system 110 and/or a computing device to which the exit system couples, such as the servers 120, to determine which items to charge to which payment instruments, as described in further detail below. The readers may include readers 202 and 204 as shown and described in FIG. 2 and may also include one or more readers 152 positioned adjacent the cameras 118. Such readers may be used to detect RFID tags as items transition through the checkout lanes 112.

In order to increase accuracy of these determinations, the systems described herein may utilize sensor data generated by additional sensors of the exit system. For example, the exit system may include a respective sensor (e.g., a camera) associated with each respective checkout lane configured to generate sensor data that may be used to determine when a user is in the lane and/or passing through the exit system. The image data may be used to identify when a user passes through the read zones and therefore a cart of items for that user may be generated based on the tags that pass through the read zone.

The image processing may be performed in a manual and/or automated process. In some examples, the system may convey the cropped video data to a remote processing location where it may be manually reviewed by one or more individuals and/or systems to identify items present within the view of the camera from the image data. The manual process may involve an individual manually marking items carried through the exit system by a user. Additional data, such as RFID data may be conveyed with the image data and/or associated with the image data such that the individual may tag or mark items visible in the image data that are also present in the RFID data. In this manner, the RFID data may be used with the camera data to increase the accuracy and performance of the automated exit system. The RFID data and image data may be used to generate training data for one or more machine-learned models to identify items based on RFID and/or image data from the exit system.

In a manual process, an individual may tag the RFID data and/or image data based on the customer, the item, the location within the exit system, the time of exit, and other such information. In a semi-automated process, one or more algorithms and/or machine-learned models may suggest associations or tags for an individual to apply to the RFID data and/or image data. In an automated process, one or more algorithms and/or machine learned models may generate tags and/or virtual shopping carts associated with the user.

In some examples, the review, through a manual, automated, or semi-automated process may be used to generate ground truth data for training one or more machine-learned models for generating cart data for individuals passing through the exit system based on RFID and/or image data.

As illustrated, the server computing devices 120 may couple to the facility 104 and/or the exit system 110 over one or more networks 122. In some instances, the network(s) 122 represent one or more wired and/or wireless networks. For instance, the server computing devices 120 may reside remote from the facility 104, while in other instances the server computing devices 120 may reside at the facility and/or as part of the exit system 110.

FIG. 1 illustrates that the server computing devices 120 may include one or more processors 124 and memory 126, which may store a tag-transaction component 148 for performing some or all of the techniques described herein. As illustrated, the tag-transaction component 148 may include a tag-transition component 128, a lane-occupancy component 130, a gate-operation component 132, a power component 134, a cart-generation component 136, and a payment component 138. In addition, the memory 126 may store reader data 140 generated by readers of the exit system 110 and/or other exit systems, sensor data 142 generated by sensors of the exit system 110 and/or other exit systems, inventory data 144 representing an inventory of the facility 104 and/or other facilities, and payment data 146 received at the payment readers of an exit system or otherwise.

The tag-transaction component 148 may also include a user interface (UI) component 154. The UI component 154 may be configured to receive reader data as well as camera data and to generate and present a user interface to a user or associate who may confirm and/or select items to associate with a virtual cart of a user, for example to build a training dataset and/or to manually confirm virtual carts of users. The UI component 154 may present information to the associate including identities of tags and associated items that are detected by the readers as well as image data from one or more cameras at or around the time that the tags transition through the exit system 110. The associate may then review the image data and reader data to confirm and/or edit or adjust the virtual cart of the user.

The UI component 154 may also be used to determine data to present in the user interface for review by the associate. For example, the UI component 154 may use reader data, sensor data, image data, and other data to determine a listing of potential items to present to the associate for confirmation and/or editing and/or building of a virtual cart. In some examples, the heat map data described herein, associated with the reader data, may be used to determine a ranking of potential items (e.g., potential items including items determined to have transitioned through the exit system and/or items no longer detected at the inventory locations) for presentation at the user interface. In this manner, the image data may be reviewed by the associated to determine items that should or should not be included in a particular virtual cart in a review process.

In a review process, the associate may select an item in the user interface generated by the UI component 154 to review a virtual cart and begin a review of the items. The user interface may include a listing of items in the virtual cart, listing of potential products based on the reader data, and/or listing of potential products from the image data. The associate may review the video, which may be a snippet or section of video data cropped around a transition time for the user or set of users associated with the virtual cart. After reviewing the video, the associate may identify items and may increase and/or decrease a confidence for items in the virtual cart. In some examples, the associate may mark items as identified and confirm their selection in the virtual cart. The virtual cart may then be finalized after review.

The tag-transition component 128 may be configured to receive and analyze the reader data 140 to determine when a particular tag has transitioned from within the facility 104 to outside the facility 104 and/or passed through the exit system 110. For instance, the tag-transition component 128 may be configured to determine when a tag has approached a first zone of a checkout lane (adjacent an inside of a facility), transitioned from the first zone to a second zone of the checkout lane (adjacent an outside of the facility or a predefined portion of the facility), and transitioned through the second zone. For instance, the tag-transition component 128 may be configured to determine when a user has carried an item from within the facility to outside the facility and, potentially, through which checkout lane the user moved. Operation of the tag-transition component 128 is described in further detail with reference to FIGS. 2 and 3.

The lane-occupancy component 130, meanwhile, is configured to determine whether and when one or more of the checkout lanes are occupied by one or more users based on the sensor data 142 generated by the respective cameras 118 and/or sensors 150. For instance, the lane-occupancy component 130 may be configured to receive sensor data 142 from a camera 118 and/or generated by the sensor 150 associated with the second checkout lane 112(2) to determine when the checkout lane 112(2) is occupied and when it is not. For instance, the lane-occupancy component 130 may store timestamp data indicating times and/or time ranges when then lane is occupied and/or time and/or time ranges when it is not. Again, the sensor 150 may comprise a beam-breaker sensor, a proximity sensor, a camera or other imaging device, a time-of-flight (ToF) sensor, a gate open/close sensor, or the like. Further, the lane-occupancy component 130 may be configured to make lane-occupancy determinations for the additional checkout lanes 112(1) and 112(3) based on the image data generated by the respective cameras 118 proximate these checkout lanes.

The gate-operation component 132 may be configured to cause the respective physical gates 116 to transition between open and closed states. In some instances, the gate-operation component 132 may receive data, from motion detectors or other sensors associated with the respective lanes, indicative of a user approaching the respective checkout lane to cause the respective gate to open. In another example, the gate-operation component 132 may cause a gate to open in response to receiving an indication from a corresponding payment reader indicating that payment data has been received. For instance, if a user provides payment data to the payment reader 114 associated with the checkout lane 112(2), the gate-operation component 132 may cause the gate 116 to transition to the open state. The gate-operation component 132 may then cause the gate 114 to transition to the closed state after a predetermined amount of time, after receiving sensor data indicating that a user is no longer occupying the checkout lane 112(2), or the like.

In some instances, the gate-operation component 132 may stagger the opening of the gates of the exits system relative to one another to help disambiguate which lane a particular tag or sets of tags are exiting through and thus increase the accuracy of applying the corresponding items to the appropriate receipts. That is, given that the reader data 140 may indicate that a tag or set of tags has potentially gone through more than one lane, such as the first lane 112(1) or the second lane 112(2), staggering the gates relative to one another increases the chances that one potential lane (e.g., the first lane 112(1)) is occupied by a user while another potential lane (e.g., the second lane 112(2)) is not occupied by a user. Thus, when the cart-generation component 136 references both the reader data 140 and the sensor data 142 as discussed below, it is likely that the sensor data 142 will indicate that one candidate lane was occupied near or at the time of the tag transition while another candidate lane was not, thus enabling the cart-generation component 136 to associate the item with the appropriate lane and, thus, the appropriate payment data and/or user account.

The power component 134 may further help to increase the accuracy of the cart-generation component 136. For instance, the power component 134 may receive sensor data indicative of a user approaching a particular checkout lane and may cause readers and/or other sensors to power on or power up in response. For instance, the readers (and/or other sensors) of the checkout lanes 112(1), 112(2), and 112(3) may remain in a powered-down or powered-off state as a default sate, until and unless a user is determined to approach a corresponding checkout lane. For instance, the exit system 110 may further include a respective motion sensor or other sensor for each checkout lane such that the motion sensor generates sensor data indicative of a user approaching a particular lane. In response to receiving this data, the power component may power on or power up the readers for generating the reader data 140.

To provide an example, envision that each of the readers associated with the checkout lanes 112(1), 112(2), and 112(3) are powered off or are in a low-power state at a first time when no users are near the exit system. However, envision that a motion sensor associated with the first checkout lane 112(1) detects a user approaching. In response to receiving this indication, the power component 134 may power on or power up the readers associated with the first checkout lane, while the readers associated with the second checkout lane and the third checkout lane remain powered down or in the low-power state. Thus, the readers associated with the first checkout lane will generate reader data 140, while the readers associated with the first lane and the second lane will (given that they are off or in the low-power state). Thus, the tag-transition component 128 is likely to accurately determine which lane the tag transitioned through.

The cart-generation component 136, meanwhile, may be configured to execute an algorithm for determining which lane an item associated with a tag transitioned through, based on the information described above, in order to associate the item with the appropriate virtual cart. For instance, the cart-generation component 136 may receive information from the tag-transition component 128 indicating which potential lane(s) a tag may have transitioned through and a respective timestamp(s) of the transition along with a respective confidence value(s). The cart-generation component 136 may also receive information from the lane-occupancy component 130 indicating which lane(s) were occupied at or near the time of the tag transition and a respective timestamp(s) at which the lane(s) were occupied. The cart-generation component 136 may then generate respective virtual carts by adding respective items to the appropriate virtual carts associated with the different lanes. For instance, if the cart-generation component 136 determines that a first tag associated with a first item passed through the first lane 112(1), the cart-generation component 136 may associate this item with a first virtual cart associated with the first lane 112(1). If the cart-generation component 136 determines that a second tag associated with a second item passed through the second lane, the cart-generation component 136 may associated this second item with a second virtual cart associated with the second lane, and so forth.

The cart-generation component 136 may be used to generate a virtual cart using reader and/or image data from the exit system 110. In some examples, the cart-generation component 136 may generate a first virtual cart having a first confidence score. The UI component 154 may be used to confirm (e.g., increase a confidence score) or to edit the virtual cart, by an associate who reviews the reader data and the image data.

In some examples, the RFID data may be used to generate a heat map of the exit system with probabilities or confidence scores of the heat map indicative of a likelihood that the RFID tag passed through the exit system at a particular location. The RFID data and/or the image data may be used by a machine-learned model to generate the heat map to determine confidence levels for items passing through the exit system through multiple parallel lanes.

The system may receive this sensor data and corresponding timestamp data to determine which of the multiple checkout lanes was occupied by a user at or near a time when the tag was determined to transition out of the facility via one or more checkout lanes. For example, a gate associated with each lane may be used to determine a start and/or end time period for a user to pass through a particular lane, based on when the gate is open and closed. In some examples the gate may be at one or both sides of the exit system. In instances where the readers of a particular checkout lane determined that the tag transitioned through the respective checkout lane and the sensor (e.g., beam breaker) of that particular checkout lane detected the presence of a user at or near the same time, the system may determine that the tag and corresponding item in fact transitioned through that checkout lane. Thus, the item may be associated with the user account of the user that passed through the checkout lane, the payment instrument of the user may be charged, and/or the like.

Further, while example data is described, it is to be appreciated that the cart-generation component 136 may use additional or alternative data to generate the virtual carts. For instance, the cart-generation component 136 may analyze inventory data 144 to help identify whether a particular item has transitioned out of the facility 104. For instance, the facility 104 may, in some examples, include other sensors 154 such as overhead cameras, weight sensors, additional RFID readers at the inventory locations 108 to detect when items are removed from the inventory locations 108, and/or the like, some or all of which may be used to determine which tags, and thus items, have been removed from the facility 104. In some examples, the sensors 154 at the inventory locations 108 may be used to measure activity at the inventory locations for triggering one or more additional actions or sensors. In one example, inventory locations within the facility may include respective readers (e.g., RFID readers) that are configured to detect the presence and/or absence of items in the inventory location. For instance, if a particular inventory location houses a number of shirts, one or more readers may be used to generate reader data for determine a current number of shirts at the inventory location over time. If the number decrements by one or more, and if the system determines (e.g., with low confidence) that a tag associated with this shirt has exited the facility, the cart-generation component 136 may use the absence of this tag associated with the shirt to increase the confidence that this shirt did in fact exit the facility 104.

For instance, envision that each set of readers generate reader data indicative of a tag exiting through the respective checkout lane at or near a first time. The techniques may then determine whether the image sensor from either or both of the checkout lanes has generated data indicative of a user occupying the respective lane within a threshold amount of time of the first time and/or analysis of the image data may reveal a visual identification of the item passing through the exit system to increase a confidence associated with the item passing through a particular one of the multiple lanes. For instance, if the user in fact walked through the first checkout lane, then the image sensor associated with the first checkout lane may have generated sensor data indicative of the user occupying the first checkout lane at a second time that is near in time to the first time. The image sensor of second checkout lane, however, would not have generated such data if no user passed through the second checkout lane near the first time. Thus, the techniques described herein may use the generated RFID data coupled with the sensor data from the image sensors to determine which lane the tag transitioned through.

Further, in some instances the techniques described herein may use the sensor data in addition to the RFID data in each instance, when an event determined with use of the reader data has a low confidence value (but not when events are high confidence), or the like. For instance, the techniques may analyze generated reader data to determine whether a threshold difference exists between the reader data generated by the respective sets of readers associated with different checkout lanes and, if so, may determine that the tag transitioned through that respective lane with high confidence. Thus, the techniques might not analyze the sensor data indicating lane occupancy. In some instances, the confidence is determined based on signal strength, read counts, and/or the like. For instance, if first and second readers generate read data having a threshold signal strength and/or read count, then the techniques may determine that the tag exited through that lane without reference to the beam-break-sensor data. If, however, no reader data meets this threshold, or an amount of separation between the respective reader data is not sufficient, then the techniques may analyze the image sensor data for making the determination.

Further, while the above examples describe using a sensor within the exit system to help increase accuracy, in other instances the systems described herein may use sensor data generated by other sensors to increase this accuracy. For instance, the facility may include other sensors such as overhead cameras, weight sensors, additional RFID readers, and/or the like, some or all of which may be used to determine which tags, and thus items, have been removed from the facility. In one example, inventory locations within the facility may include respective readers (e.g., RFID readers) that are configured to detect the presence and/or absence of items in the inventory location. For instance, if a particular inventory location houses a number of shirts, one or more readers may be used to generate reader data for determine a current number of shirts at the inventory location over time. If the number decrements by one or more, and if the system determines (e.g., with low confidence) that a tag associated with this shirt has exited the facility, the system may use the absence of this tag associated with the shirt to increase the confidence that this shirt did in fact exit the facility.

In some instances, a virtual cart may be generated for items that are determined to have pass through a particular lane during a session that is defined based on a predefined window of time, between the opening and closing of a respective gate, or so forth. For instance, upon a first user providing their payment data at the payment reader of the second lane 112(2), the gate 116 may open and the user may pass through with one or more items. The cart-generation component 136 may associate each of these items with a virtual cart associated with the user and the payment component 138 may charge the payment data associated with the user for each of these items. Further, and as described above, the techniques may enable multiple users shopping as a group to pass through the respective checkout lane and providing single payment data and the payment component 138 may charge the payment data for each item that passed through the lane.

FIG. 2A illustrates additional details of an exit system 110 introduced in FIG. 1. As illustrated, the exit system 110 may include a respective payment reader 114(1), 114(2), and 114(3) at each checkout lane 112(1), 112(2), and 112(3) for receiving payment data for paying for items that a user carries out of the facility 104. In addition, the exit system 110 may include a physical gate 116(1), 116(2) and 116(3), each configured to open upon receiving the payment data and close after one or more users pass through the respective checkout lane. In addition, the exit system 110 may include, for each checkout lane, a first set of readers for identifying tags approaching the checkout lane and a second set of readers for identifying tags exiting the checkout lane, such that the exit system or servers coupled thereto may determine when tags transition from within the facility 104 to outside the facility 104. For instance, the exit system may include first readers 202(1) and second readers 204(1) associated with the first checkout lane 112(1), first readers 202(2) and second readers 204(2) associated with the second checkout lane 112(2), and first readers 202(3) and second readers 204(3) associated with the third checkout lane 112(3). As will be appreciated, the first readers 202(1) are configured to generate reader data as a user carrying item(s) with tag(s) coupled thereto approaches the first checkout lane 112(1), the first readers 202(2) are configured to generate reader data as a user carrying item(s) with tag(s) coupled thereto approaches the second checkout lane 112(2), and the first readers 202(3) are configured to generate reader data as a user carrying item(s) with tag(s) coupled thereto approaches the third checkout lane 112(3). As will also be appreciated, each of these first readers may generate reader data, albeit with lesser strength, as tags approach checkout lanes other than the respective checkout lane to which they are most proximate.

In addition, the second readers 204(1) are configured to generate reader data as a user carrying item(s) with tag(s) coupled thereto exits the first checkout lane 112(1), the second readers 204(2) are configured to generate reader data as a user carrying item(s) with tag(s) coupled thereto exits the second checkout lane 112(2), and the second readers 204(3) are configured to generate reader data as a user carrying item(s) with tag(s) coupled thereto exits the third checkout lane 112(3). Again, each of these second readers may generate reader data, albeit with lesser strength, as tags exit checkout lanes other than the respective checkout lane to which they are most proximate.

The checkout lanes 112 are equipped with cameras 118 that are positioned overhead to provide a view of the checkout lanes 112 for indications of user presence as well as a view of items that are carried through the checkout lane 112 by a user.

Figure 3:
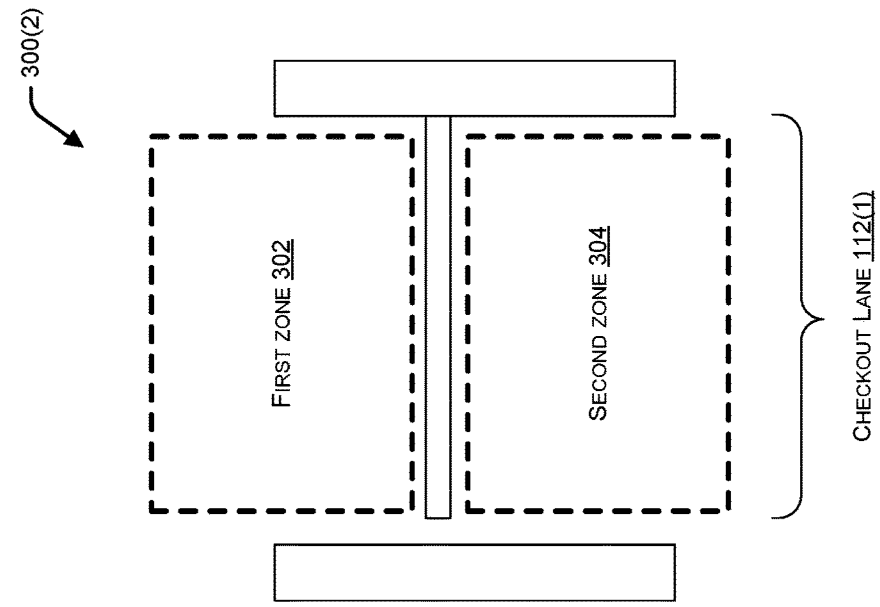
FIG. 3 illustrates different zones defined within a respective checkout lane of the exit system of FIG. 1.
Figure 3:
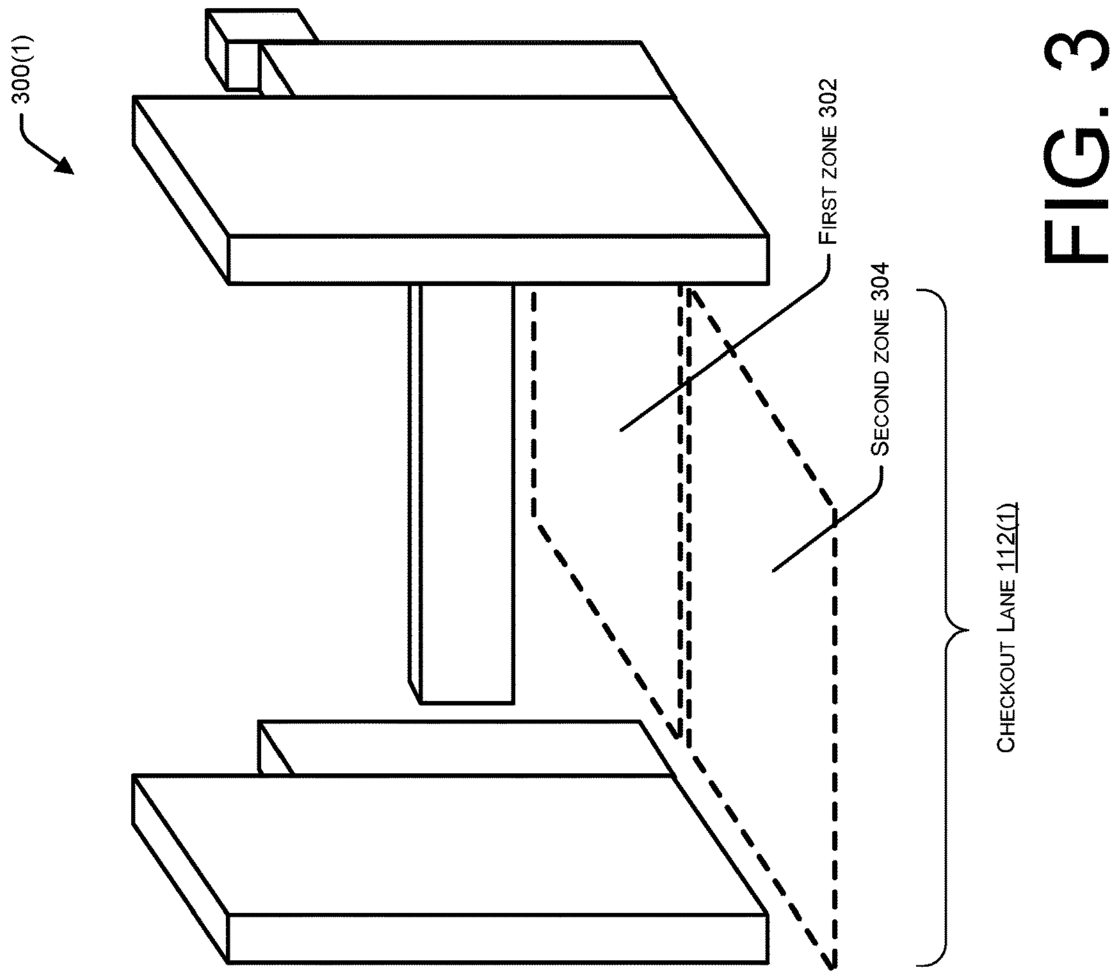

FIG. 3, for instance, illustrates different zones defined within a respective checkout lane. As illustrated, the checkout lane 112(1) may include a first zone 302 occupied by a user approaching the checkout lane 112(1) and a second zone 304 occupied by the user exiting the checkout lane 112(1). As will be appreciated the first readers 202(1) associated with the first checkout lane 112(1) may be oriented to generate the highest level of reader data when a tag enters the first zone 302, while the second readers 204(2) associated with the first checkout lane 112(1) may be oriented to generate the highest level of reader data when a tag passes through the second zone 304. Again, however, the other readers may generate reader data as a tag passes through these zones associated with the first checkout lane, resulting in potential ambiguity regarding which lane a particular tag passed through.

In some examples, the first zone 302 and the second zone 304 may be used to determine a transition through a checkout lane 112. In some examples, the zones may be used for determining transitions of users (e.g., customers) and tags through the RFID data and/or the image data.

In some examples, the RFID data may be used to generate a heat map of the checkout lane 112(1) with probabilities or confidence scores of the heat map indicative of a likelihood that the RFID tag passed through the checkout lane 112(1). The RFID data and/or the image data may be used by a machine-learned model to generate the heat map to determine confidence levels for items passing through the exit system through multiple parallel lanes.

Returning to FIG. 2A, each checkout lane 112(1), 112(2), and 112(3) may be associated with a respective camera 118(1), 118(2), and 118(3). As discussed above, each of these cameras may generate image data indicative of times at which a corresponding lane is occupied at times at which a corresponding lane is not occupied as well as items that are carried through the checkout lanes 112. Thus, in instances where the tag-transition component 128 has not determined with a threshold confidence level the lane through which a tag transitioned, the lane-occupancy component 130 and/or cart-generation component 136 may analyze the image data from the cameras 118(1)-(3) to determine which lanes were occupied near in time to the time of the tag transition. The lane-occupancy component 130 and/or the cart-generation component 136 may analyze image data generated by the camera 118(1) and the image data generated by the second camera 118(2) to determine whether one or both of the checkout lanes 112(1) and/or 112(2) were occupied near in time to the tag-transition time 406. In this example, the image data may indicate that the first lane 112(1) was occupied within a threshold amount of time of the tag-transition time while second lane 112(2) was not. The cart-generation component 136 may use this output from the lane-occupancy component 130 in addition to the output of the tag-transition component 128 to determine that the tag transitioned through the first checkout lane.

In addition, FIG. 2A illustrates that each lane may be associated with another respective sensor 206(1), 206(2), and 206(3) configured to detect a user approaching the respective lane for causing corresponding readers and/or sensors to power on or power up. For instance, each of the first and second readers 202 and 204, and/or the cameras 118, may remain off or in a low-power state as a default state. However, upon a corresponding sensor 206 identifying an approaching user, these readers 202 and 204 and/or cameras 118 may be powered on. For instance, if the sensor 206(1) detects a user approaching the first checkout lane 112(1), the readers 202(1) and 204(1) may be powered on or power up, as may be the camera 118(1). The remaining readers 202(2), 202(3), 204(2), and 204(3), as well as the cameras 118(2) and 118(3), may remain powered down or off. As discussed above, this may help decrease the possibility of confusion regarding which checkout lane one or more tag(s) have in fact transitioned through, given that not all readers may be powered on or up and, thus, might not generate reader during a certain timeframe where tags are transitioning through one of the checkout lanes.

While FIG. 2A illustrates the payment readers 114(1)-(3) oriented away from the respective checkout lanes 112(1)-(3), in other instances these payment readers 114(1)-(3) may be oriented in other manners. FIG. 2B, for instance, illustrates that the payment readers 114(1)-(3) may be oriented to face towards each respective checkout lane 112(1)-(3). In other words, each of the payment readers 114 may be oriented 90° from the orientation shown in FIG. 2A. In some instances, orienting the payment readers 114 in this manner may increase the accuracy of the determination of which tags passed through which lanes. That is, because of the orientation of the payment readers 114 towards the checkout lanes 112, a user interacting with the payment reader by providing a payment instrument may be positioned further within the respective checkout lane and, thus, between the readers on both sides of the respective checkout lane. Thus, the tags coupled to the items being carried by the user may be nearer the center of the respective checkout lane and further away from the other checkout lanes that the user is not occupying, thus increasing the accuracy of the reader data. That is, because the tags will be positioned further away from the first and second readers that associated with the checkout lanes that the user is not currently occupying, the reader data generated by the these readers may be generally weaker than if the payment reader were positioned such that the user, and thus the tags coupled to the items the user currently carries, is nearer these adjacent checkout lanes. In addition, the orientation of the user towards the first and second readers of the checkout lane that the user is currently occupied may be towards the payment readers and, thus, the tags coupled to the items that the user currently carries may also be towards the first and second readers, thus avoiding interference in the reader-data signal to the body of the user residing between the tags and the first and second readers.

Figure 4:
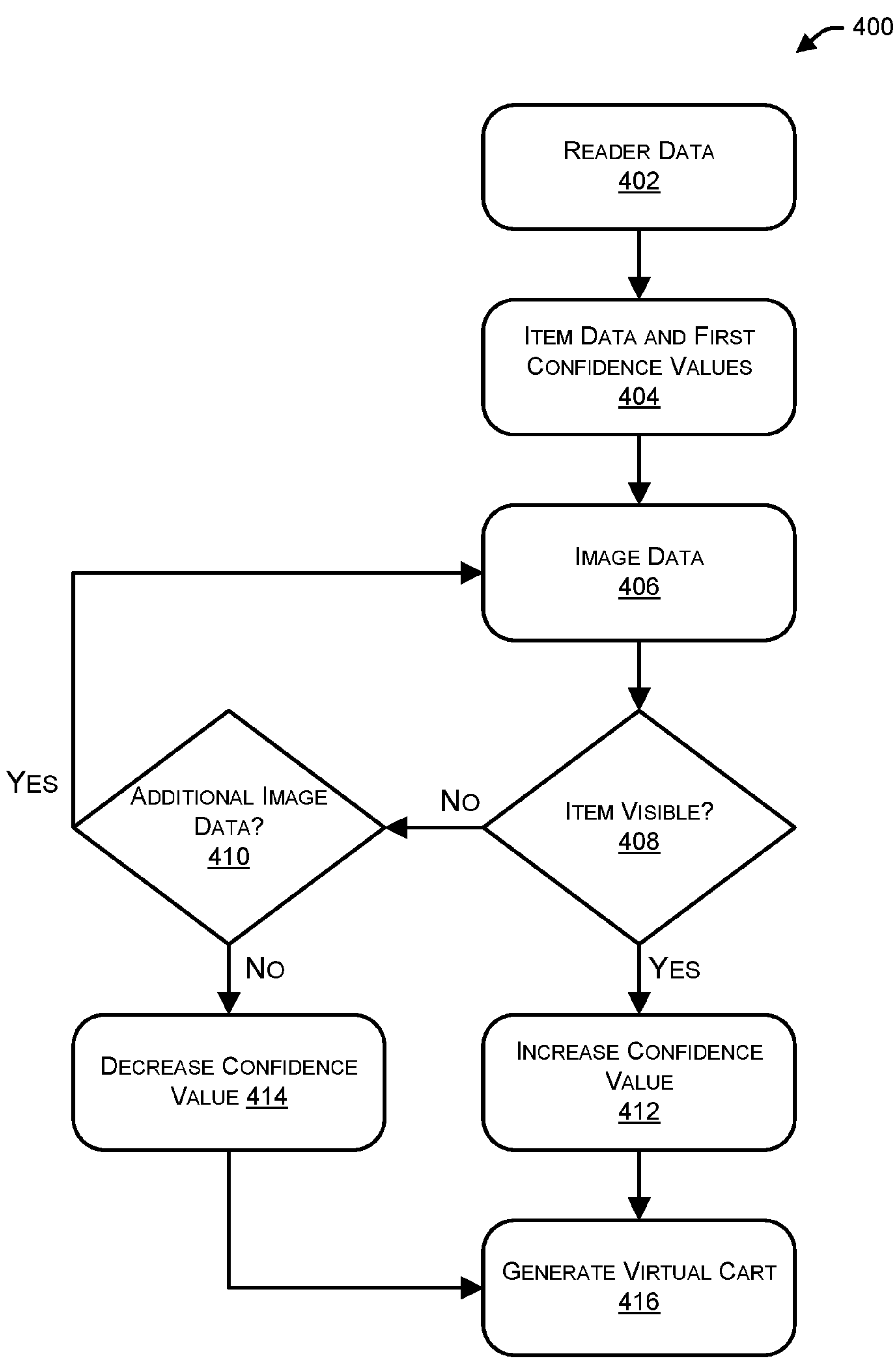
FIG. 4 illustrates a process for generating a virtual cart based on reader data and/or image data.

FIG. 4 illustrates a process for generating a virtual cart based on reader data and/or image data. The process 400, and the other processes discussed herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

At 402, the process 400 includes receiving an authentication signal. Receiving the authentication signal may include receiving payment data based on information received by a payment reader associated with a particular checkout lane. For instance, a user may have swiped, dipped, tapped, or scanned a payment instrument, visual indicia on a mobile device, or the like at the payment reader and the corresponding payment data may be received by one or more computing devices communicatively coupled to the payment reader. This payment data may also be accompanied with an indication of which checkout lane the payment data was received at. In some examples, the authentication signal may include data from one or more sensors, such as a beam break sensor or proximity sensor indicating a user is approaching or near a checkout lane. The process 400 may be triggered by the authentication signal and/or one or more sensors as described herein such that image gathering, image processing, reader data gathering, data analysis, and other such processes or operations may be triggered by the authentication signal rather than operating all the time. In this manner, the system may conserver resources (power and computing resources) and may also prevent interference, for example to prevent interference between RFID antennas in adjacent lanes.

At 404, the process 400 includes receiving reader data from one or more reader antennas of a checkout system. The reader antennas may include one or more RFID antennas, such as described above. The reader data may correspond to items that are carried through a checkout lane and/or exit system of a facility. In some examples, the reader data may correspond to RFID or other such data that is determined from one or more reader antennas at or near inventory locations of the facility. In this manner, the reader antenna may determine RFID tags that pass through the checkout system and/or are no longer present at a shelf location (e.g., by comparing a first point in time against a second point in time). The reader data may be received by one or more computing devices at the facility and/or remote from the facility.

At 406, the process 400 includes the one or more computing devices determining item data and first confidence values associated with items included in the item data. The item data may include identities of items identified by the reader data. The confidence values may be associated with one or more heat maps indicative of probabilities that the items included in the item data passed through different regions of the checkout system. For instance, based on the reader data, the computing device may determine one or more likely locations for the items over a period of time, such as during a window of time when the user is present at the checkout lane.

At 408, the process 400 includes the computing device receiving image data 406 from one or more cameras positioned at and/or adjacent the checkout system. For example, the camera may be directed such that it has a field of view that encompasses one or more of the checkout lanes.

At 410, the process 400 includes the computing device determining lane presence at the checkout system. The computing device may use the image data from 408 to determine one or more lanes where one or more users are positioned, and may therefore identify a particular lane and set of sensors to use for identifying items and determining the virtual cart of the user, as described herein.

At 412, the process 400 includes the computing device (which may be remote and/or local to the facility) receiving and/or determining that an item is visible within the image data. The image data may be manually and/or automatically processed to identify items using one or more image recognition techniques and/or machine learning algorithms. In some examples, the manual process may include a manual human-based review of the image data based on a timestamp associated with the user being within the checkout lane.

In the event that the item is visible, either based on manual and/or automated processing of the image data, then at 414, the process 400 includes increasing the confidence value associated with the item. The confidence value may be increased such that the item may be determined to be included within a virtual cart when the confidence value is above a threshold. For instance, based on the first confidence value at 406 and increasing the confidence value, the item may be included in a virtual cart 416.

The image data and identification of the item within the image data may be used to generate training data and/or ground truth data for training one or more machine learning algorithms that may be used to generate a virtual cart based on reader data from one or more sets of RFID readers. In this manner, the reader data may be tagged with indications of items based on the manual and/or automated processing of the image data.

In the event that the item is not visible in the image data at 412, then the computing device may determine if additional image data is available at 418. The additional image data may include image data from a predetermined threshold before and after a timestamp associated with the user traversing the checkout lane. In this manner, additional image data may be viewed and/or analyzed (as needed) to identify items carried by the user.

If additional image data is available at 418, then the process 400 may return to 408 to continue processing the additional image data. If no additional image data is available at 418, then the computing device may decrease a confidence value at 420 associated with the item being in possession of the user, and therefore decrease a probability and/or confidence value associated with the item being in the virtual cart at 416.

Figure 5:
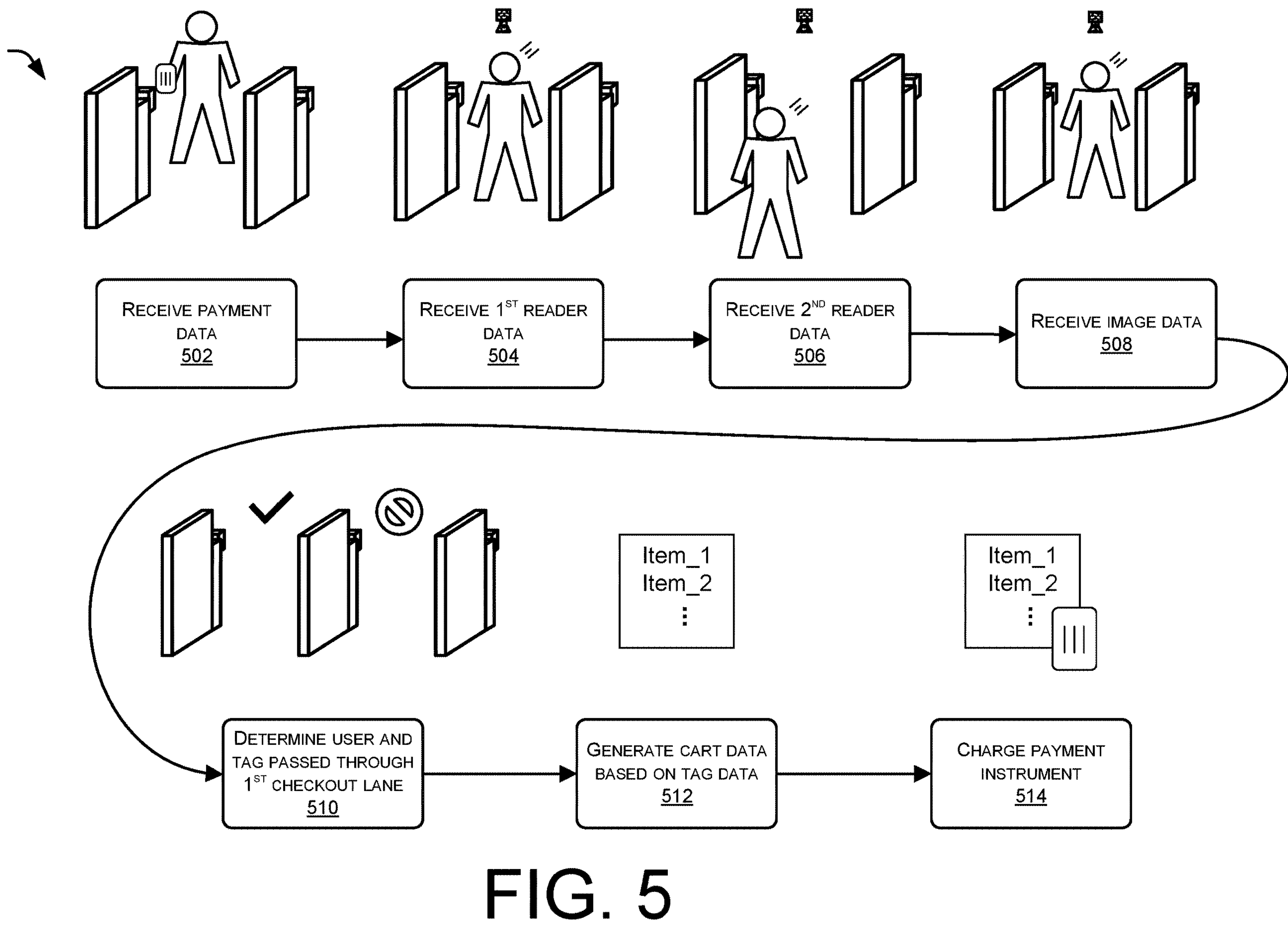

FIG. 5 illustrates an example sequence of operations including a user providing payment data to a payment reader associated with a checkout lane, readers associated with different checkout lanes generating reader data indicating that a tag associated with an item potentially transitioned through each checkout lane, receiving image data of a user passing through one of the checkout lanes, and charging the payment instrument for the item based on determining which checkout lane the tag transitioned through. The process 600, and the other processes discussed herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

The example sequence of operations 500 includes, at an operation 502, receiving payment data based on information received by a payment reader associated with a particular checkout lane. For instance, a user may have swiped, dipped, tapped, or scanned a payment instrument, visual indicia on a mobile device, or the like at the payment reader and the corresponding payment data may be received by one or more computing devices communicatively coupled to the payment reader. This payment data may also be accompanied with an indication of which checkout lane the payment data was received at.

At an operation 504, the computing device(s) may receive first reader data indicative of a tag approaching a first zone of a first checkout lane. That is, the first reader data may be received from one or more first readers oriented to detect tags approaching a first zone of the first checkout lane. An operation 506 represents the computing device(s) receiving second reader data indicative of a tag transitioning to and exiting through a second zone of the first checkout lane. That is, the second reader data may be received from one or more second readers oriented to detect tags approaching and exiting a second zone of the first checkout At an operation 508, the computing devices receiving image data generated by one or more cameras of the first checkout lane, the second checkout, and/or the like. In this example, the image data may include still and/or moving image data and may be used to identify items carried by the user as well as to identify that a user occupied the first lane (e.g., passed through) at a time that is near in time to the time associated with the reader data received at the operations 504-506.

At an operation 510, the computing devices analyzes the reader data received at the operations 504-506 as well as the imager data received at the operation 508 to determine that user and/or the tag passed through the first checkout lane (and, thus, not the second checkout lane). In some instances, the computing devices may also factor in that payment data was received at the payment reader associated with the first checkout lane near in time to the reader data and the additional sensor data.

At an operation 512, the computing devices generate cart data based on the determination of the operation 510. For instance, the computing devices may determine, from inventory data, an item associated with the tag and may add information associated with this item to a virtual cart associated with the first checkout lane at a time that is based at least in part at a time at which the payment data was received, a gate opened, and/or the like. At an operation 514, the computing devices may charge the payment data received at the operation 502 for the item(s) indicated in the virtual cart.

Figure 6:
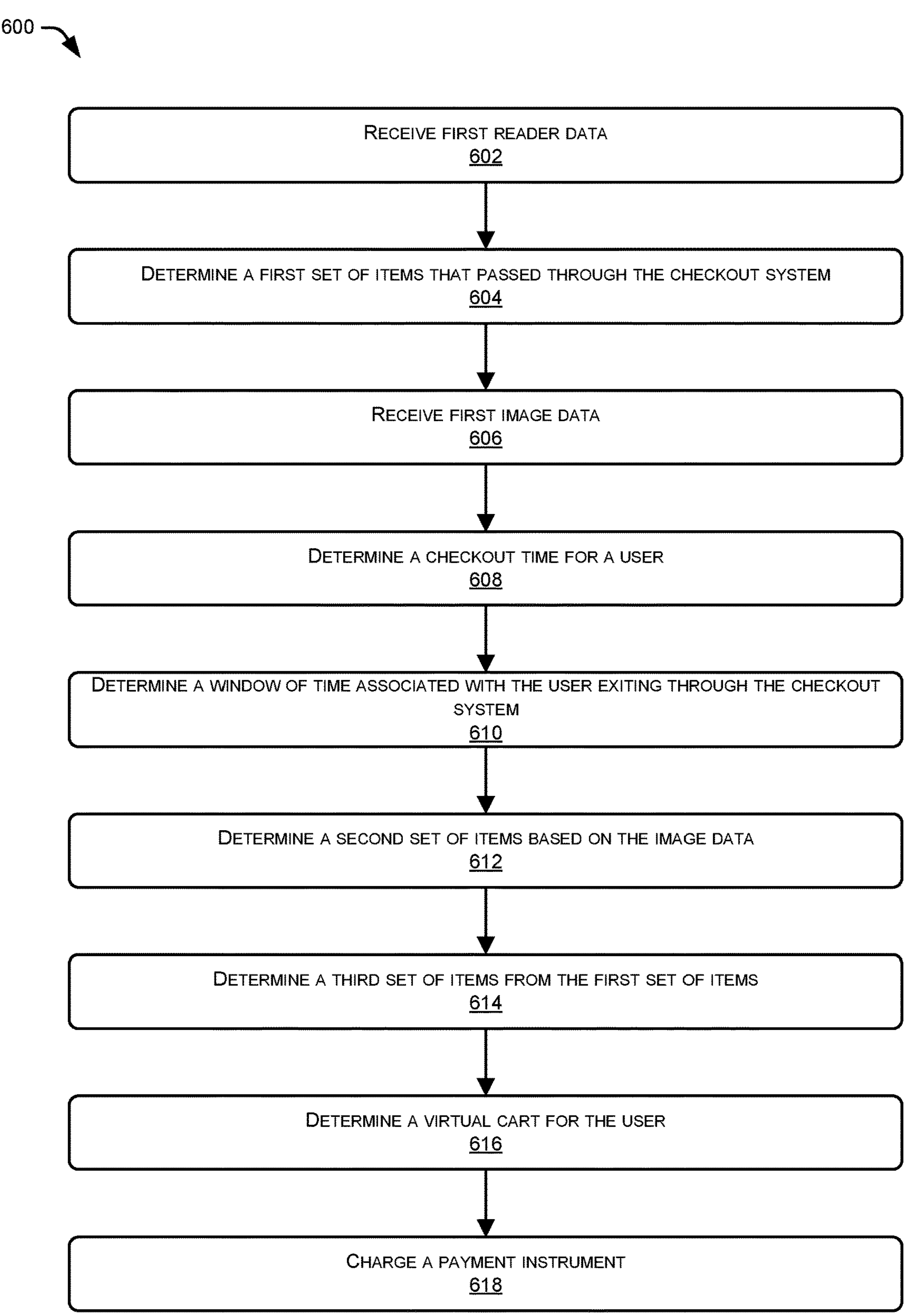
FIG. 6 illustrates a flow diagram of an example process for using reader data and image data to determine which checkout lane an item coupled to a tag exited a facility through and using this determination to charge an appropriate payment instrument for a cost of the item.

FIG. 6 illustrates a flow diagram of an example process for using reader data and image data to determine which checkout lane an item coupled to a tag exited a facility through and using this determination to charge an appropriate payment instrument for a cost of the item. The process 600, and the other processes discussed herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

An operation 602 represents a computing device (or set of computing devices) associated with the facility, such as the facility 702 described below, receiving an authentication signal. Receiving the authentication signal may include receiving payment data based on information received by a payment reader associated with a particular checkout lane. For instance, a user may have swiped, dipped, tapped, or scanned a payment instrument, visual indicia on a mobile device, or the like at the payment reader and the corresponding payment data may be received by one or more computing devices communicatively coupled to the payment reader. This payment data may also be accompanied with an indication of which checkout lane the payment data was received at. In some examples, the authentication signal may include data from one or more sensors, such as a beam break sensor or proximity sensor indicating a user is approaching or near a checkout lane. The process 400 may be triggered by the authentication signal and/or one or more sensors as described herein such that image gathering, image processing, reader data gathering, data analysis, and other such processes or operations may be triggered by the authentication signal rather than operating all the time. In this manner, the system may conserver resources (power and computing resources) and may also prevent interference, for example to prevent interference between RFID antennas in adjacent lanes.

An operation 604 represents a computing device (or set of computing devices) associated with the facility, such as the facility 702 described below, receiving first reader data. The first reader data may come from one or more reader antennas, such as RFID antennas, from a cashierless checkout system of the facility 702. The first reader data may be captured over time, and in some examples may be captured in response to one or more other sensors, such as a beam break sensor associated with the checkout system.

An operation 606 represented the computing device (or set of computing devices) determining a first set of items that pass through the checkout system over a period of time. The first set of items may be determined based on one or more tags being detected by an antenna of the reader system.

At operation 608, the process 600 include the computing device(s) receiving first image data. The first image data may be received from a camera, such as the camera described herein that has a field of view that includes one or more lanes of the checkout system. In some examples, the first image data may include image data from multiple cameras representing the multiple checkout lanes of the cashierless checkout system.

At operation 610, the process 600 includes the computing device(s) determining a checkout time for a user. The checkout time may be based on detection of a person passing through a checkout lane as visible in the first image data. In some examples, the checkout time may be based on one or more additional sensors such as a beam break sensor, proximity sensor, or other such sensor. In some examples, the checkout time may be based on actuation of a gate in one of the checkout lanes of the checkout system.

At operation 612, the process 600 includes determining a window of time associated with the user exiting through the checkout system. The window may include a period of time before and after the checkout time. In this manner, the window of sensor and/or image data of the process 600 may be analyzed during the lead up to the user passing through the checkout system as well as after the user passes through the system to ensure that the items are all accounted for by the cashierless checkout system.

At operation 614, the process 600 includes determining a second set of items based on the image data. Using a manual and/or automated process as described herein, the computing device(s) may determine and/or receive an indication of a set of items visible within the image data during the window of time.

At operation 616, the process 600 includes determining a third set of items from the first set of items and the second set of items. The third set of items may be a subset of the first set of items and the second set of items identified by the reader data and may be identified based on the window of time as well as based on items identified within the image data by the computing device. In some examples, the third set of items may be determined based on a confidence value, for example using the first set of items and the second set of items to determine a confidence score for each item included in each set and then building or selecting the third set of items from the union of the first set of items and the second set of items. In some examples, the third set of items may be based on selecting items based on the union of the first set of items and the second set of items. In some examples, the third set of items may be determined based on a confidence score. The first set of items may each have an associated confidence score. The second set of items may be used to increase and/or decrease the confidence scores of the first set of items (e.g., to increase the confidence score if included in both the first set and the second set and to decrease the confidence score if only included in the first set or the second set). In some examples, based on the first set of items and the second set of items being input into a trained machine learning model, the third set of items may represent the output of the machine learning model. The machine learning model may be trained using virtual cart data with image and reader data associated with the virtual cart such that the tags of the data indicate items that are or are not in the virtual cart from the image and/or reader data.

At operation 618, the process 600 includes determining a virtual cart for the user. The virtual cart may include a list of items, the list of items representative of items that the user carried with them through the exit system. The virtual cart may be associated with a user identifier, payment instrument, or other unique identifier such that the computing device(s) can process payment by charging a payment instrument of the user at 620.

Figure 7:
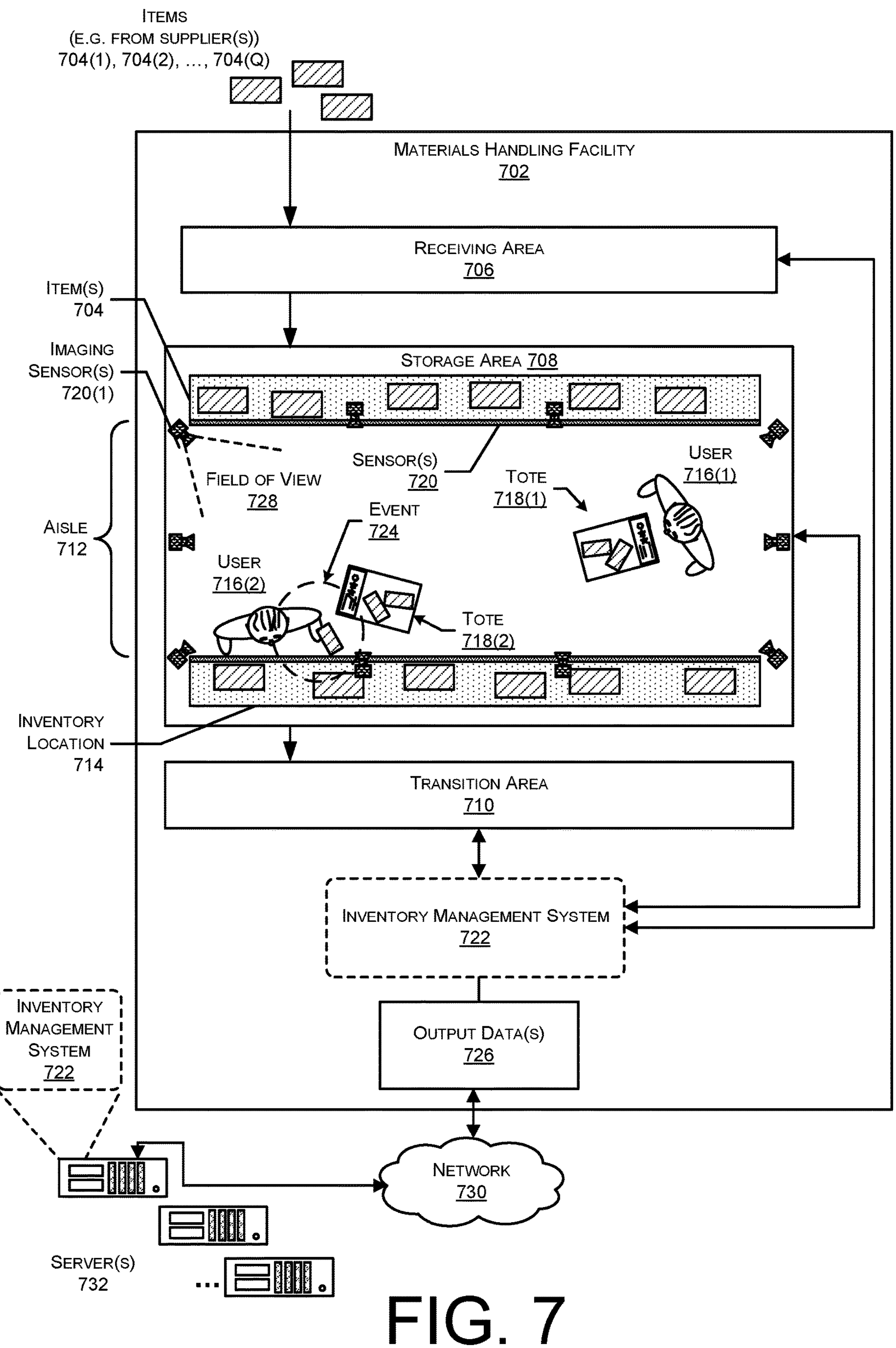
FIG. 7 is a block diagram of an example materials handling facility that includes sensors and an inventory management system configured to generate output regarding events occurring in the facility using the sensor data.
Figure 8:
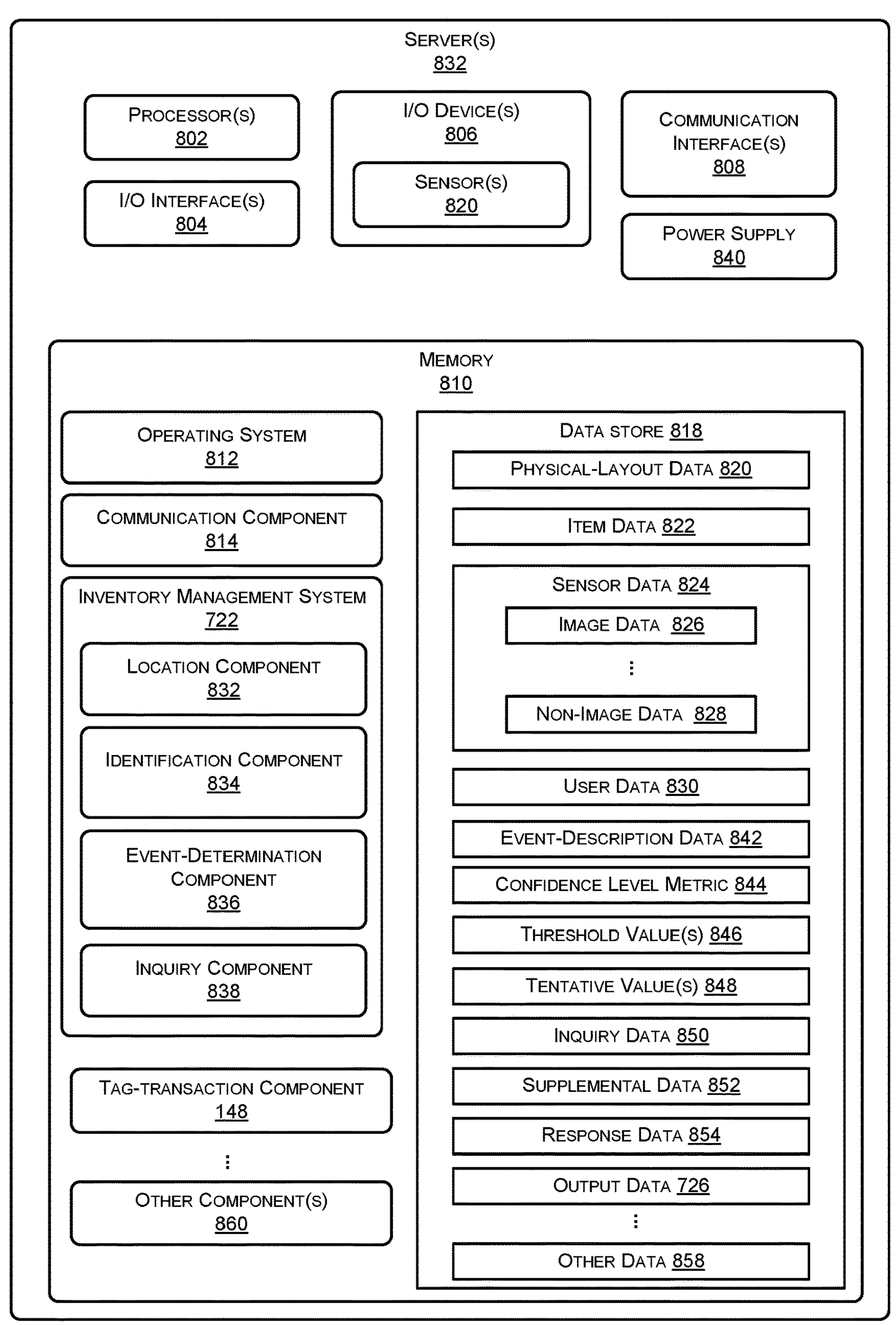
FIG. 8 illustrates a block diagram of one or more servers configured to support operation of the facility. As illustrated, the servers may include the cart-association component introduced in FIG. 1 for determining respective users to associate with respective mobile carts in the example facility of FIG. 1.

FIGS. 7 and 8 represent an illustrative materials handing environment, such as the materials handling facility 702, in which the techniques described herein may be. However, the following description is merely one illustrative example of an industry and environment in which the techniques described herein may be utilized. For instance, while the example facility 702 includes cameras and other sensors for detecting events within the facility, the techniques described herein may be utilized by facilities that are entirely free from these additional sensors. Instead, the exit system 110 and server computing devices 120 communicatively coupled thereto may be employed in a standalone manner.

In the illustrated example, the materials handling facility 702 (or "facility") comprises one or more physical structures or areas within which one or more items 704(1), 704(2), . . . , 704(Q) (generally denoted as 704) may be held.

As used in this disclosure, letters in parenthesis such as "(Q)" indicate an integer result. The items 704 comprise physical goods, such as books, pharmaceuticals, repair parts, electronic gear, groceries, and so forth.

The facility 702 may include one or more areas designated for different functions with regard to inventory handling. In this illustration, the facility 702 includes a receiving area 706, a storage area 708, and a transition area 710. The receiving area 706 may be configured to accept items 704, such as from suppliers, for intake into the facility 702. For example, the receiving area 706 may include a loading dock at which trucks or other freight conveyances unload the items 704.

The storage area 708 is configured to store the items 704. The storage area 708 may be arranged in various physical configurations. In one implementation, the storage area 708 may include one or more aisles 712. The aisle 712 may be configured with, or defined by, inventory locations 714 on one or both sides of the aisle 712. The inventory locations 714 may include one or more of shelves, racks, cases, cabinets, bins, floor locations, or other suitable storage mechanisms for holding or storing the items 704. The inventory locations 714 may be affixed to the floor or another portion of the facility's structure, or may be movable such that the arrangements of aisles 712 may be reconfigurable. In some implementations, the inventory locations 714 may be configured to move independently of an outside operator. For example, the inventory locations 714 may comprise a rack with a power source and a motor, operable by a computing device to allow the rack to move from one location within the facility 702 to another.

One or more users 716(1), 716(2), . . . , 716(U), totes 718(1), 718(2), . . . , 718(T) (generally denoted as 718) or other material handling apparatus may move within the facility 702. For example, the users 716 may move about within the facility 702 to pick or place the items 704 in various inventory locations 714, placing them on the totes 718 for ease of transport. An individual tote 718 is configured to carry or otherwise transport one or more items 704. For example, a tote 718 may include a basket, a cart, a bag, and so forth. In other implementations, other agencies such as robots, forklifts, cranes, aerial drones, and so forth, may move about the facility 702 picking, placing, or otherwise moving the items 704.

One or more sensors 720 may be configured to acquire information in the facility 702. The sensors 720 in the facility 702 may include sensors fixed in the environment (e.g., ceiling-mounted cameras) or otherwise, such as sensors in the possession of users (e.g., mobile phones, tablets, etc.). The sensors 720 may include, but are not limited to, cameras 720(1), weight sensors, radio frequency (RF) receivers, temperature sensors, humidity sensors, vibration sensors, and so forth. The sensors 720 may be stationary or mobile, relative to the facility 702. For example, the inventory locations 714 may contain cameras 720(1) configured to acquire images of pick or placement of items 704 on shelves, of the users 716(1) and 716(2) in the facility 702, and so forth. In another example, the floor of the facility 702 may include weight sensors configured to determine a weight of the users 716 or other object thereupon.

During operation of the facility 702, the sensors 720 may be configured to provide information suitable for tracking how objects move or other occurrences within the facility 702. For example, a series of images acquired by a camera 720(1) may indicate removal of an item 704 from a particular inventory location 714 by one of the users 716 and placement of the item 704 on or at least partially within one of the totes 718.

While the storage area 708 is depicted as having one or more aisles 712, inventory locations 714 storing the items 704, sensors 720, and so forth, it is understood that the receiving area 706, the transition area 710, or other areas of the facility 702 may be similarly equipped. Furthermore, the arrangement of the various areas within the facility 702 is depicted functionally rather than schematically. For example, multiple different receiving areas 706, storage areas 708, and transition areas 710 may be interspersed rather than segregated in the facility 702.

The facility 702 may include, or be coupled to, an inventory management system 722, which may perform some or all of the techniques described above with reference to FIGS. 1-6B. For example, the inventory management system may maintain a virtual cart of each user within the facility. The inventory management system may also store a record associated with each user indicating the identity of the user, the location of the user, and whether the user is eligible to exit the facility with one or more items without performing a manual checkout of the items. The inventory management system may also generate and output notification data to the users, indicating whether or not they are so eligible.

As illustrated, the inventory management system 722 may reside at the facility 702 (e.g., as part of on-premises servers), on the servers 732 that are remote from the facility 702, or a combination thereof. In each instance, the inventory management system 722 is configured to identify interactions and events with and between users 716, devices such as sensors 720, robots, material handling equipment, computing devices, and so forth, in one or more of the receiving area 706, the storage area 708, or the transition area 710. As described above, some interactions may further indicate the existence of one or more events 724—or predefined activities of interest. For example, events 724 may include the entry of the user 716 to the facility 702, stocking of items 704 at an inventory location 714, picking of an item 704 from an inventory location 714, returning of an item 704 to an inventory location 714, placement of an item 704 within a tote 718, movement of users 716 relative to one another, gestures by the users 716, and so forth. Other events 724 involving users 716 may include the user 716 providing authentication information in the facility 702, using a computing device at the facility 702 to authenticate identity to the inventory management system 722, and so forth. Some events 724 may involve one or more other objects within the facility 702. For example, the event 724 may comprise movement within the facility 702 of an inventory location 714, such as a counter mounted on wheels. Events 724 may involve one or more of the sensors 720. For example, a change in operation of a sensor 720, such as a sensor failure, change in alignment, and so forth, may be designated as an event 724. Continuing the example, movement of a camera 720(1) resulting in a change in the orientation of the field of view 728 (such as resulting from someone or something bumping the camera 720(1)) may be designated as an event 724.

By determining the occurrence of one or more of the events 724, the inventory management system 722 may generate output data 726. The output data 726 comprises information about the event 724. For example, where the event 724 comprises an item 704 being removed from an inventory location 714, the output data 726 may comprise an item identifier indicative of the particular item 704 that was removed from the inventory location 714 and a user identifier of a user that removed the item.

The inventory management system 722 may use one or more automated systems to generate the output data 726. For example, an artificial neural network, one or more classifiers, or other automated machine learning techniques may be used to process the sensor data from the one or more sensors 720 to generate output data 726. For example, the inventory management system may perform some or all of the techniques for generating and utilizing a classifier for identifying user activity in image data, as described in detail above. The automated systems may operate using probabilistic or non-probabilistic techniques. For example, the automated systems may use a Bayesian network. In another example, the automated systems may use support vector machines to generate the output data 726 or the tentative results. The automated systems may generate confidence level data that provides information indicative of the accuracy or confidence that the output data 726 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 95%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 704, user 716, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 716 may pick an item 704(1) such as a perfume bottle that is generally cubical in shape from the inventory location 714. Other items 704 at nearby inventory locations 714 may be predominately spherical. Based on the difference in shape (cube vs. sphere) from the adjacent items, and the correspondence in shape with the previously stored image of the perfume bottle item 704(1) (cubical and cubical), the confidence level that the user 716 has picked up the perfume bottle item 704(1) is high.

In some situations, the automated techniques may be unable to generate output data 726 with a confidence level above a threshold result. For example, the automated techniques may be unable to distinguish which user 716 in a crowd of users 716 has picked up the item 704 from the inventory location 714. In other situations, it may be desirable to provide human confirmation of the event 724 or of the accuracy of the output data 726. For example, some items 704 may be deemed age restricted such that they are to be handled only by users 716 above a minimum age threshold.

In instances where human confirmation is desired, sensor data associated with an event 724 may be processed to generate inquiry data. The inquiry data may include a subset of the sensor data associated with the event 724. The inquiry data may also include one or more of one or more tentative results as determined by the automated techniques, or supplemental data. The subset of the sensor data may be determined using information about the one or more sensors 720. For example, camera data such as the location of the camera 720(1) within the facility 702, the orientation of the camera 720(1), and a field of view 728 of the camera 720(1) may be used to determine if a particular location within the facility 702 is within the field of view 728. The subset of the sensor data may include images that may show the inventory location 714 or that the item 704 was stowed. The subset of the sensor data may also omit images from other cameras 720(1) that did not have that inventory location 714 in the field of view 728. The field of view 728 may comprise a portion of the scene in the facility 702 that the sensor 720 is able to generate sensor data about.

Continuing the example, the subset of the sensor data may comprise a video clip acquired by one or more cameras 720(1) having a field of view 728 that includes the item 704. The tentative results may comprise the "best guess" as to which items 704 may have been involved in the event 724. For example, the tentative results may comprise results determined by the automated system that have a confidence level above a minimum threshold.

The facility 702 may be configured to receive different kinds of items 704 from various suppliers and to store them until a customer orders or retrieves one or more of the items 704. A general flow of items 704 through the facility 702 is indicated by the arrows of FIG. 7. Specifically, as illustrated in this example, items 704 may be received from one or more suppliers, such as manufacturers, distributors, wholesalers, and so forth, at the receiving area 706. In various implementations, the items 704 may include merchandise, commodities, perishables, or any suitable type of item 704, depending on the nature of the enterprise that operates the facility 702. The receiving of the items 704 may comprise one or more events 724 for which the inventory management system 722 may generate output data 726.

Upon being received from a supplier at receiving area 706, the items 704 may be prepared for storage. For example, items 704 may be unpacked or otherwise rearranged. The inventory management system 722 may include one or more software applications executing on a computer system to provide inventory management functions based on the events 724 associated with the unpacking or rearrangement. These inventory management functions may include maintaining information indicative of the type, quantity, condition, cost, location, weight, or any other suitable parameters with respect to the items 704. The items 704 may be stocked, managed, or dispensed in terms of countable, individual units or multiples, such as packages, cartons, crates, pallets, or other suitable aggregations. Alternatively, some items 704, such as bulk products, commodities, and so forth, may be stored in continuous or arbitrarily divisible amounts that may not be inherently organized into countable units. Such items 704 may be managed in terms of measurable quantity such as units of length, area, volume, weight, time, duration, or other dimensional properties characterized by units of measurement. Generally speaking, a quantity of an item 704 may refer to either a countable number of individual or aggregate units of an item 704 or a measurable amount of an item 704, as appropriate.

After arriving through the receiving area 706, items 704 may be stored within the storage area 708. In some implementations, like items 704 may be stored or displayed together in the inventory locations 714 such as in bins, on shelves, hanging from pegboards, and so forth. In this implementation, all items 704 of a given kind are stored in one inventory location 714. In other implementations, like items 704 may be stored in different inventory locations 714. For example, to optimize retrieval of certain items 704 having frequent turnover within a large physical facility 702, those items 704 may be stored in several different inventory locations 714 to reduce congestion that might occur at a single inventory location 714. Storage of the items 704 and their respective inventory locations 714 may comprise one or more events 724.

When a customer order specifying one or more items 704 is received, or as a user 716 progresses through the facility 702, the corresponding items 704 may be selected or "picked" from the inventory locations 714 containing those items 704. In various implementations, item picking may range from manual to completely automated picking. For example, in one implementation, a user 716 may have a list of items 704 they desire and may progress through the facility 702 picking items 704 from inventory locations 714 within the storage area 708, and placing those items 704 into a tote 718. In other implementations, employees of the facility 702 may pick items 704 using written or electronic pick lists derived from customer orders. These picked items 704 may be placed into the tote 718 as the employee progresses through the facility 702. Picking may comprise one or more events 724, such as the user 716 in moving to the inventory location 714, retrieval of the item 704 from the inventory location 714, and so forth.

After items 704 have been picked, they may be processed at a transition area 710. The transition area 710 may be any designated area within the facility 702 where items 704 are transitioned from one location to another or from one entity to another. For example, the transition area 710 may be a packing station within the facility 702. When the item 704 arrives at the transition area 710, the items 704 may be transitioned from the storage area 708 to the packing station. The transitioning may comprise one or more events 724. Information about the transition may be maintained by the inventory management system 722 using the output data 726 associated with those events 724.

In another example, if the items 704 are departing the facility 702 a list of the items 704 may be obtained and used by the inventory management system 722 to transition responsibility for, or custody of, the items 704 from the facility 702 to another entity. For example, a carrier may accept the items 704 for transport with that carrier accepting responsibility for the items 704 indicated in the list. In another example, a customer may purchase or rent the items 704 and remove the items 704 from the facility 702. The purchase or rental may comprise one or more events 724.

The inventory management system 722 may access or generate sensor data about the facility 702 and the contents therein including the items 704, the users 716, the totes 718, and so forth. The sensor data may be acquired by one or more of the sensors 720, data provided by other systems, and so forth. For example, the sensors 720 may include cameras 720(1) configured to acquire image data of scenes in the facility 702. The image data may comprise still images, video, or a combination thereof. The image data may be processed by the inventory management system 722 to determine a location of the user 716, the tote 718, the identity of the user 716, and so forth. As used herein, the identity of the user may represent a unique identifier of the user (e.g., name, number associated with user, username, etc.), an identifier that distinguishes the user amongst other users being located with the environment, or the like.

The inventory management system 722, or systems coupled thereto, may be configured to identify the user 716, as well as to determine other candidate users. In one implementation, this determination may comprise comparing sensor data with previously stored identity data. For example, the user 716 may be identified by showing their face to a facial recognition system, by presenting a token carrying authentication credentials, providing a fingerprint, scanning a barcode or other type of unique identifier upon entering the facility, and so forth. Identity of the user 716 may be determined before, during, or after entry to the facility 702. Determination of the user's 716 identity may comprise comparing sensor data associated with the user 716 in the facility 702 to previously stored user data.

In some instances, the inventory management system group users within the facility into respective sessions. That is, the inventory management system 722 may utilize the sensor data to determine groups of users that are effectively "together" (e.g., shopping together). In some instances, a particular session may include multiple users that entered the facility 702 together and, potentially, that navigate the facility together. For example, when a family of two adults and two children enter the facility together, the inventory management system may associate each user with a particular session. Locating sessions in addition to individual users may help in determining the outcome of individual events, given that users within a session may not only individually pick or return or otherwise interact with items, but may also pass the items back and forth amongst each other. For instance, a child in the above example may pick the box of cereal before handing the box to her mother, who may place it in her tote 718. Noting the child and the mother as belonging to the same session may increase the chances of successfully adding the box of cereal to the virtual shopping cart of the mother.

By determining the occurrence of one or more events 724 and the output data 726 associated therewith, the inventory management system 722 is able to provide one or more services to the users 716 of the facility 702. By utilizing one or more human associates to process inquiry data and generate response data that may then be used to produce output data 726, overall accuracy of the system may be enhanced. The enhanced accuracy may improve the user experience of the one or more users 716 of the facility 702. In some examples, the output data 726 may be transmitted over a network 730 to one or more servers 732.

FIG. 8 illustrates a block diagram of the one or more servers 732. The servers 732 may be physically present at the facility 702, may be accessible by the network 730, or a combination of both. The servers 732 do not require end-user knowledge of the physical location and configuration of the system that delivers the services. Common expressions associated with the servers 732 may include "on-demand computing," "software as a service (SaaS)," "cloud services," "data centers," and so forth. Services provided by the servers 732 may be distributed across one or more physical or virtual devices.

The servers 732 may include one or more hardware processors 802 (processors) configured to execute one or more stored instructions. The processors 802 may comprise one or more cores. The servers 732 may include one or more input/output (I/O) interface(s) 804 to allow the processor 802 or other portions of the servers 732 to communicate with other devices. The I/O interfaces 804 may comprise Inter-Integrated Circuit (I2C), Serial Peripheral Interface bus (SPI), Universal Serial Bus (USB) as promulgated by the USB Implementers Forum, and so forth.

The servers 732 may also include one or more communication interfaces 806. The communication interfaces 806 are configured to provide communications between the servers 732 and other devices, such as the sensors 720, the interface devices, routers, and so forth. The communication interfaces 806 may include devices configured to couple to personal area networks (PANs), wired and wireless local area networks (LANs), wired and wireless wide area networks (WANs), and so forth. For example, the communication interfaces 806 may include devices compatible with Ethernet, Wi-Fi™, and so forth. The servers 732 may also include one or more busses or other internal communications hardware or software that allow for the transfer of data between the various modules and components of the servers 732.

The servers 732 may also include a power supply 840. The power supply 840 is configured to provide electrical power suitable for operating the components in the servers 732.

The servers 732 may further include one or more memories 810. The memory 810 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 810 provides storage of computer-readable instructions, data structures, program modules, and other data for the operation of the servers 732. A few example functional modules are shown stored in the memory 810, although the same functionality may alternatively be implemented in hardware, firmware, or as a system on a chip (SOC).

The memory 810 may include at least one operating system (OS) component 812. The OS component 812 is configured to manage hardware resource devices such as the I/O interfaces 804, the communication interfaces 808, and provide various services to applications or components executing on the processors 802. The OS component 812 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 810. These components may be executed as foreground applications, background tasks, daemons, and so forth. A communication component 814 may be configured to establish communications with one or more of the sensors 720, one or more of the devices used by associates, other servers 732, or other devices. The communications may be authenticated, encrypted, and so forth.

The memory 810 may store an inventory management system 722. The inventory management system 722 is configured to provide the inventory functions as described herein with regard to the inventory management system 722. For example, the inventory management system 722 may track movement of items 704 in the facility 702, generate user interface data, and so forth.

The inventory management system 722 may access information stored in one or more data stores 818 in the memory 810. The data store 818 may use a flat file, database, linked list, tree, executable code, script, or other data structure to store the information. In some implementations, the data store 818 or a portion of the data store 818 may be distributed across one or more other devices including other servers 732, network attached storage devices, and so forth.

The data store 818 may include physical layout data 820. The physical layout data 820 provides a mapping of physical locations within the physical layout of devices and objects such as the sensors 720, inventory locations 714, and so forth. The physical layout data 820 may indicate the coordinates within the facility 702 of an inventory location 714, sensors 720 within view of that inventory location 714, and so forth. For example, the physical layout data 820 may include camera data comprising one or more of a location within the facility 702 of a camera 720(1), orientation of the camera 720(1), the operational status, and so forth. Continuing example, the physical layout data 820 may indicate the coordinates of the camera 720(1), pan and tilt information indicative of a direction that the field of view 728 is oriented along, whether the camera 720(1) is operating or malfunctioning, and so forth.

In some implementations, the inventory management system 722 may access the physical layout data 820 to determine if a location associated with the event 724 is within the field of view 728 of one or more sensors 720. Continuing the example above, given the location within the facility 702 of the event 724 and the camera data, the inventory management system 722 may determine the cameras 720(1) that may have generated images of the event 724.

The item data 822 comprises information associated with the items 704. The information may include information indicative of one or more inventory locations 714 at which one or more of the items 704 are stored. The item data 822 may also include order data, SKU or other product identifier, price, quantity on hand, weight, expiration date, images of the ITEM 704, detail description information, ratings, ranking, and so forth. The inventory management system 722 may store information associated with inventory management functions in the item data 822.

The data store 818 may also include sensor data 824. The sensor data 824 comprises information acquired from, or based on, the one or more sensors 720. For example, the sensor data 824 may comprise 3D information about an object in the facility 702. As described above, the sensors 720 may include a camera 720(1), which is configured to acquire one or more images. These images may be stored as the image data 826. The image data 826 may comprise information descriptive of a plurality of picture elements or pixels. Non-image data 828 may comprise information from other sensors 720, such as input from the microphones, weight sensors, and so forth.

User data 830 may also be stored in the data store 818. The user data 830 may include identity data, information indicative of a profile, purchase history, location data, images of the user 716, demographic data, and so forth. Individual users 716 or groups of users 716 may selectively provide user data 830 for use by the inventory management system 722. The individual users 716 or groups of users 716 may also authorize collection of the user data 830 during use of the facility 702 or access to user data 830 obtained from other systems. For example, the user 716 may opt-in to collection of the user data 830 to receive enhanced services while using the facility 702.

In some implementations, the user data 830 may include information designating a user 716 for special handling. For example, the user data 830 may indicate that a particular user 716 has been associated with an increased number of errors with respect to output data 726. The inventory management system 722 may be configured to use this information to apply additional scrutiny to the events 724 associated with this user 716. For example, events 724 that include an item 704 having a cost or result above the threshold amount may be provided to the associates for processing regardless of the determined level of confidence in the output data 726 as generated by the automated system.

The inventory management system 722 may include one or more of a location component 832, identification component 834, event-determination component 836, inquiry component 838, and the tag-transaction component 148, potentially amongst other components 860.

The location component 832 functions to locate items or users within the environment of the facility to allow the inventory management system 722 to assign certain events to the correct users. That is, the location component 832 may assign unique identifiers to users as they enter the facility and, with the users' consent, may locate the users throughout the facility 702 over the time they remain in the facility 702. The location component 832 may perform this locating using sensor data 824, such as the image data 826. After a particular user enters the facility, the location component 832 may store locations associated with an identifier of the user as the user moves within the facility 702. As described above, the location may be stored in association with user identifiers that do not explicitly identify the user. That, each user identifier may comprise an alphanumeric string that does not include personally identifiable information (PII).

In some instances, upon receiving the indication of a time and location of an event in question, the location component 832 may query the data store 818 to determine which one or more user identifiers were at or within a threshold distance of the location of the event at the particular time of the event. Further, the location component 832 may assign different confidence levels to different users, with the confidence levels indicating how likely it is that each corresponding user is the user that is in fact associated with the event of interest.

The location component 832 may access the sensor data 824 in order to determine this location data of the user and/or items. The location data provides information indicative of a location of an object, such as the item 704, the user 716, the tote 718, and so forth. The location may be absolute with respect to the facility 702 or relative to another object or point of reference. Absolute terms may comprise a latitude, longitude, and altitude with respect to a geodetic reference point. Relative terms may include a location of 25.4 meters (m) along an x-axis and 125.2 m along a y-axis as designated by a floor plan of the facility 702, 5.2 m from an inventory location 714 along a heading of 169°, and so forth. For example, the location data may indicate that the user 716(1) is 25.2 m along the aisle 712(1) and standing in front of the inventory location 714. In comparison, a relative location may indicate that the user 716(1) is 32 cm from the tote 718 at a heading of 83° with respect to the tote. The location data may include orientation information, such as which direction the user 716 is facing. The orientation may be determined by the relative direction the user's 716 body is facing. In some implementations, the orientation may be relative to the interface device. Continuing the example, the location data may indicate that the user 716(1) is oriented with a heading of 0°, or looking north. In another example, the location data may indicate that the user 716 is facing towards the interface device.

The identification component 834 is configured to identify an object. In one implementation, the identification component 834 may be configured to identify an item 704. In another implementation, the identification component 834 may be configured to identify the user 716. For example, the identification component 834 may use facial recognition techniques to process the image data 826 and determine the identity data of the user 716 depicted in the images by comparing the characteristics in the image data 826 with previously stored results. The identification component 834 may also access data from other sensors 720, such as from an RFID reader, an RF receiver, fingerprint sensors, and so forth.

The event-determination component 836 is configured to process the sensor data 824 and generate output data 726. The event-determination component 836 may access information stored in the data store 818 including, but not limited to, event description data 842, confidence levels 844, or threshold values 846. In some instances, the event-determination component 836 may be configured to perform some or all of the techniques described above with regards to the event-determination component 836. For instance, the event-determination component 836 may be configured to create and utilize event classifiers for identifying events (e.g., predefined activity) within image data, potentially without use of other sensor data acquired by other sensors in the environment.

The event description data 842 comprises information indicative of one or more events 724. For example, the event description data 842 may comprise predefined profiles that designate movement of an item 704 from an inventory location 714 with the event 724 of "pick". The event description data 842 may be manually generated or automatically generated. The event description data 842 may include data indicative of triggers associated with events occurring in the facility 702. An event may be determined as occurring upon detection of the trigger. For example, sensor data 824 such as a change in weight from a weight sensor at an inventory location 714 may trigger detection of an event of an item 704 being added or removed from the inventory location 714. In another example, the trigger may comprise an image of the user 716 reaching a hand toward the inventory location 714. In yet another example, the trigger may comprise two or more users 716 approaching to within a threshold distance of one another.

The event-determination component 836 may process the sensor data 824 using one or more techniques including, but not limited to, artificial neural networks, classifiers, decision trees, support vector machines, Bayesian networks, and so forth. For example, the event-determination component 836 may use a decision tree to determine occurrence of the "pick" event 724 based on sensor data 824. The event-determination component 836 may further use the sensor data 824 to determine one or more tentative results 848. The one or more tentative results 848 comprise data associated with the event 724. For example, where the event 724 comprises a disambiguation of users 716, the tentative results 848 may comprise a list of possible user 716 identities. In another example, where the event 724 comprises a disambiguation between items 704, the tentative results 848 may comprise a list of possible item identifiers. In some implementations, the tentative result 848 may indicate the possible action. For example, the action may comprise the user 716 picking, placing, moving an item 704, damaging an item 704, providing gestural input, and so forth.

In some implementations, the tentative results 848 may be generated by other components. For example, the tentative results 848 such as one or more possible identities or locations of the user 716 involved in the event 724 may be generated by the location component 832. In another example, the tentative results 848 such as possible items 704 that may have been involved in the event 724 may be generated by the identification component 834.

The event-determination component 836 may be configured to provide a confidence level 844 associated with the determination of the tentative results 848. The confidence level 844 provides indicia as to the expected level of accuracy of the tentative result 848. For example, a low confidence level 844 may indicate that the tentative result 848 has a low probability of corresponding to the actual circumstances of the event 724. In comparison, a high confidence level 844 may indicate that the tentative result 848 has a high probability of corresponding to the actual circumstances of the event 724.

In some implementations, the tentative results 848 having confidence levels 844 that exceed the threshold may be deemed to be sufficiently accurate and thus may be used as the output data 726. For example, the event-determination component 836 may provide tentative results 848 indicative of the three possible items 704 corresponding to the "pick" event 724. The confidence levels 844 associated with the possible items 704 may be 25%, 120%, 92%, respectively. Continuing the example, the threshold result 846 may be set such that confidence level 844 of 90% are deemed to be sufficiently accurate. As a result, the event-determination component 836 may designate the "pick" event 724 as involving item 704(3).

The inquiry component 838 may be configured to use at least a portion of the sensor data 824 associated with the event 724 to generate inquiry data 850. In some implementations, the inquiry data 850 may include one or more of the tentative results 848 or supplemental data 852. The inquiry component 838 may be configured to provide inquiry data 850 to one or more devices associated with one or more human associates.

An associate user interface is presented on the respective devices of associates. The associate may generate response data 854 by selecting a particular tentative result 848, entering new information, indicating that they are unable to answer the inquiry, and so forth.

The supplemental data 852 comprises information associated with the event 724 or that may be useful in interpreting the sensor data 824. For example, the supplemental data 852 may comprise previously stored images of the items 704. In another example, the supplemental data 852 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 826 during presentation to an associate.

The inquiry component 838 processes the response data 854 provided by the one or more associates. The processing may include calculating one or more statistical results associated with the response data 854. For example, statistical results may include a count of the number of times associates selected a particular tentative result 848, determination of a percentage of the associates that selected a particular tentative result 848, and so forth.

The inquiry component 838 is configured to generate the output data 726 based at least in part on the response data 854. For example, given that a majority of the associates returned response data 854 indicating that the item 704 associated with the "pick" event 724 is item 704(5), the output data 726 may indicate that the item 704(5) was picked.

The inquiry component 838 may be configured to selectively distribute inquiries to particular associates. For example, some associates may be better suited to answering particular types of inquiries. Performance data, such as statistical data about the performance of the associates, may be determined by the inquiry component 838 from the response data 854 provided by the associates. For example, information indicative of a percentage of different inquiries in which the particular associate selected response data 854 that disagreed with the majority of associates may be maintained. In some implementations, test or practice inquiry data 850 having a previously known correct answer may be provided to the associate for training or quality assurance purposes. The determination of the set of associates to use may be based at least in part on the performance data.

By using the inquiry component 838, the event-determination component 836 may be able to provide high reliability output data 726 that accurately represents the event 724. The output data 726 generated by the inquiry component 838 from the response data 854 may also be used to further train the automated systems used by the inventory management system 722. For example, the sensor data 824 and the output data 726, based on response data 854, may be provided to one or more of the components of the inventory management system 722 for training in process improvement. Continuing the example, this information may be provided to an artificial neural network, Bayesian network, and so forth, to further train these systems such that the confidence level 844 and the tentative results 848 produced in the future for the same or similar input is improved. Finally, as FIG. 8 illustrates, the servers 732 may store and/or utilize other data 858.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A checkout system comprising:
- a first checkout lane including one or more walls defining a transition zone;
- a first RFID antenna system positioned on or within the one or more walls and directed into the transition zone;
- a first camera positioned above the first checkout lane and having a field of view that comprises the transition zone;
- one or more processors; and
- one or more non-transitory computer-readable media having instructions stored thereon that, when executed by the one or more processors, cause the one or more processors to perform operations comprising:
  - receiving first RFID data from the first RFID antenna system;
  - determining, by a tag-transition component based on the first RFID data, a first set of items that passed through the checkout system;
  - receiving first image data from the first camera;
  - determining, by a lane-occupancy component based at least on the first image data, a checkout time for a user based on a timestamp associated with the user traversing the transition zone;
  - determining, by the lane-occupancy component based on the timestamp, a window of time associated with the user passing through the first checkout lane;
  - determining, by a cart-generation component based on a first portion of the first image data associated with the window of time, a second set of items associated with the user;
  - determining, by the cart-generation component, a third set of items associated with the user based at least in part on a subset of the first set of items and the second set of items determined based at least in part on a union between the first set of items and the second set of items;
  - determining, by the cart-generation component, a virtual cart for the user based on the third set of items; and
  - charging, by a payment component, a payment instrument associated with the first checkout lane for the virtual cart.

2. The checkout system of claim 1, wherein determining the third set of items comprises:
- determining a first set of confidence scores associated with the first set of items;
- determining a second set of confidence scores associated with the second set of items;
- adjusting a confidence score value of one or more of the first set of confidence scores based on the second set of confidence scores to produce reconciled confidence score data; and
- determining the third set of items based on the reconciled confidence score data.

3. The checkout system of claim 1, wherein the first checkout lane comprises a gate proximate the first checkout lane, the gate configured to toggle between a closed state and an open state based at least in part on receiving payment information from the user, and wherein determining the checkout time is based on the timestamp associated with the gate transitioning from the closed state to the open state as the user traverses the transition zone.

4. The checkout system of claim 1, wherein determining the third set of items comprises providing the first RFID data to a machine learned algorithm trained using RFID data from one or more RFID antennas of a cashierless checkout system, the RFID data tagged based on image data from one or more cameras of the cashierless checkout system to indicate a lane of a plurality of checkout lanes of the cashierless checkout system an item having an RFID tag passed through.

5. A method comprising:
- receiving first reader data from one or more first reader antennas positioned proximate and directed toward a first checkout lane of a checkout system in a facility;
- determining, by a tag-transition component based on the first reader data, a first set of items that passed through the checkout system;
- receiving first image data from one or more cameras positioned proximate and directed toward the first checkout lane in the facility;
- determining, by a lane-occupancy component, a checkout time for a user based at least on the first image data and on a timestamp associated with the user traversing the first checkout lane;
- determining, by the lane-occupancy component based on the timestamp, a window of time associated with the user passing through the first checkout lane;
- determining, by a cart-generation component, a second set of items associated with the user based on a portion of the first image data associated with the window of time;
- determining, by the cart-generation component, a third set of items associated with the user based at least in part on the first set of items and the second set of items;
- determining, by the cart-generation component, a virtual cart for the user based on the third set of items; and
- charging, by a payment component, a payment instrument associated with the virtual cart.

6. The method of claim 5, wherein determining the third set of items comprises:

providing the first reader data and first image data to one or more machine learned algorithms trained using a set of reader data and a set of image data associated with a cashierless checkout system, the set of reader data and the set of image data tagged based on review of items to indicate a lane of a plurality of checkout lanes of the cashierless checkout system an item having a tag readable by the one or more first reader antennas passed through.

7. The method of claim 5, wherein determining the virtual cart comprises:

determining a first set of confidence scores associated with the first set of items;

determining a second set of confidence scores associated with the second set of items;

adjusting a confidence score value of one or more of the first set of confidence scores based on the second set of confidence scores to produce reconciled confidence score data; and determining the third set of items based on the reconciled confidence score data.

8. The method of claim 5, wherein receiving the first reader data comprises:

receiving second reader data from one or more second reader antennas positioned proximate a first zone of the first checkout lane in the facility; and receiving third reader data from one or more third antennas positioned proximate a second zone of the first checkout lane, and wherein determining the checkout time comprises analyzing the second reader data and the third reader data to determine the timestamp associated with a tag transitioning from the first zone of the first checkout lane to the second zone of the first checkout lane.

9. The method of claim 5, further comprising:

receiving payment information from the user; and causing a first physical gate proximate to the first checkout lane to transition from a closed state to an open state based at least in part on receiving the payment information, wherein charging the payment instrument comprises charging the payment information of the user.

10. The method of claim 5, wherein determining the third set of items comprises:

generating a user interface comprising a representation of the first set of items or the second set of items;

displaying, via the user interface, at least a part of the portion of the first image data; and receiving, via the user interface, an indication of an item visible in the first image data, wherein determining the third set of items is further based on the indication.

11. The method of claim 5, further comprising:

receiving second reader data from one or more second reader antennas positioned proximate a second side of the first checkout lane, wherein the first reader antennas are positioned proximate a first side of the first checkout lane; and determining the checkout time is based at least in part on detecting a transition of an item by the one or more first reader antennas to the one or more second reader antennas.

12. The method of claim 5, wherein determining the third set of items comprises:

conveying the portion of the first image data to a user device;

generating a user interface comprising a representation of the first set of items, the second set of items, the first reader data, and the first image data; and receiving, from the user device, an indication of the third set of items.

13. The method of claim 5, wherein determining the virtual cart comprises:

determining a first listing of potential items based on the first set of items or the second set of items;

determining a first set of confidence values, each confidence value in the first set of confidence values associated with an item of the first listing of potential items;

determining a second set of confidence values by adjusting the first set of confidence values for the first listing of potential items based on the third set of items; and determining the virtual cart based on the second set of confidence values.

14. A system comprising:

one or more processors; and one or more computer-readable media storing computer-executable instructions that, when executed, cause the one or more processors to perform acts comprising:

receiving first reader data from one or more first reader antennas positioned proximate and directed toward a first checkout lane of a checkout system in a facility;

determining, by a tag-transition component based on the first reader data, a first set of items that passed through the checkout system;

receiving first image data from one or more cameras positioned proximate and directed toward the first checkout lane in the facility;

determining, by a lane-occupancy component, a checkout time for a user based at least on the first image data and on a timestamp associated with the user traversing the first checkout lane;

determining, by the lane-occupancy component based on the timestamp, a window of time associated with the user passing through the first checkout lane;

determining, by a cart-generation component, a second set of items associated with the user based on a portion of the first image data associated with the window of time;

determining, by the cart-generation component, a third set of items associated with the user based at least in part on the first set of items and the second set of items;

determining, by the cart-generation component, a virtual cart for the user based on the second set of items and the third set of items; and charging, by a payment component, a payment instrument associated with the virtual cart.

15. The system of claim 14, wherein determining the virtual cart comprises:

determining a first set of confidence scores associated with the first set of items;

determining a second set of confidence scores associated with the second set of items;

adjusting a confidence score value of one or more of the first set of confidence scores based on the second set of confidence scores to produce reconciled confidence score data; and determining the third set of items based on the reconciled confidence score data.

16. The system of claim 14, wherein determining the virtual cart comprises:

determining a first listing of potential items based on the first set of items;

determining a first set of confidence values, with individual confidence values associated with individual items of the first listing of potential items;

adjusting the first set of confidence values based at least in part on the second set of items to produce a second set of confidence values; and determining the third set of items based at least in part on the second set of confidence values.

17. The system of claim 14, wherein determining the third set of items comprises:

providing the first reader data and the first image data to one or more machine learned algorithms trained using reader data and a set of image data associated with a cashierless checkout system, the reader data and the set of image data tagged based on review of items to indicate a lane of a plurality of checkout lanes of the cashierless checkout system an item having a tag readable by the one or more first reader antennas passed through.

18. The system of claim 14, wherein receiving the first reader data comprises:

receiving second reader data from one or more second reader antennas positioned proximate a first zone of the first checkout lane in the facility; and receiving third reader data from one or more third antennas positioned proximate a second zone of the first checkout lane, and wherein determining the checkout time comprises analyzing the second reader data and the third reader data to determine the timestamp associated with a tag transitioning from the first zone of the first checkout lane to the second zone of the first checkout lane.

19. The system of claim 14, wherein determining the second set of items comprises:

conveying the portion of the first image data to a user device;

generating a user interface comprising a representation of the first set of items, the second set of items, the first reader data, and the first image data; and receiving, from the user device, an indication of the third set of items.

20. The system of claim 14, the acts further comprising receiving second reader data from one or more second reader antennas positioned proximate an inventory location, and wherein:

the receiving the second reader data comprises receiving second reader data indicating that an item is absent from the inventory location; and determining the second set of items is further based on the second reader data at least partly in response to the receiving the second reader data indicating that the item is absent from the inventory location.

* * * * *